(12) United States Patent
Long et al.

(10) Patent No.: US 11,987,653 B1
(45) Date of Patent: May 21, 2024

(54) OLEFIN POLYMERIZATIONS AND PRINTING METHODS THEREOF

(71) Applicant: University of Tennessee Research Foundation, Knoxville, TN (US)

(72) Inventors: Brian Keith Long, Knoxville, TN (US); Jordan Michael Kaiser, Hanover Park, IL (US)

(73) Assignee: University of Tennessee Research Foundation, Knoxville, TN (US)

(*) Notice: Subject to any disclaimer, the term of this patent is extended or adjusted under 35 U.S.C. 154(b) by 646 days.

(21) Appl. No.: 16/827,002

(22) Filed: Mar. 23, 2020

Related U.S. Application Data

(60) Provisional application No. 62/821,634, filed on Mar. 21, 2019.

(51) Int. Cl.
| | |
|---|---|
| *C08F 2/50* | (2006.01) |
| *B29C 64/112* | (2017.01) |
| *B29K 105/00* | (2006.01) |
| *B33Y 10/00* | (2015.01) |
| *B33Y 70/00* | (2020.01) |
| *C08J 5/18* | (2006.01) |
| *C09D 11/101* | (2014.01) |
| *C09D 11/108* | (2014.01) |

(52) U.S. Cl.
CPC ............... *C08F 2/50* (2013.01); *B33Y 70/00* (2014.12); *C08J 5/18* (2013.01); *C09D 11/101* (2013.01); *C09D 11/108* (2013.01); *B29C 64/112* (2017.08); *B29K 2105/0002* (2013.01); *B29K 2105/0014* (2013.01); *B33Y 10/00* (2014.12); *C08F 2500/26* (2013.01); *C08J 2323/06* (2013.01); *C08J 2323/20* (2013.01)

(58) Field of Classification Search
CPC ........ C08F 2/50; C08F 2500/26; B33Y 70/00; B33Y 10/00; C08J 5/18; C08J 2323/06; C08J 2323/20; B29C 64/112; B29K 2105/0002; B29K 2105/0014
See application file for complete search history.

(56) References Cited

U.S. PATENT DOCUMENTS

2011/0039082 A1* 2/2011 Yun .......................... C08J 5/18
525/227

OTHER PUBLICATIONS

Sugazaki et al., machine English translation of JP 2003-252939 (Year: 2003).*
Anderson et al.,(2016) "Redox-Active Ligands: An Advanced Tool To Modulate Polyethylene Microstructure,"J. Am. Chem. Soc., 138 (3),pp. 774-777.
Anderson W.C.; Long B. K., (2016) "Modulating Polyolefin Composition via Redox-Active Olefin Polymerization Catalysts," ACS Macro Lett., 5(9), pp. 1029-1033.
Berman, B., (2012), "3-D printing: The new industrial revolution," Bus Horizons, 55 (2), pp. 155-162.
Bhushan, B.; Caspers, M., (2017) "An overview of additive manufacturing (3D printing) for microfabrication," Microsyst Technol, 23 (4), pp. 1117-1124.
Chen et al., (2000) "Cocatalysts for Metal-Catalyzed Olefin Polymerization: Activators, Activation Processes, and Structure-Activity Relationships," Chem. Rev.100; 44 Pages.
Chen, E. Y-X; Marks, T. J., (2000) "Cocatalysts for Meta-Catalyzed Olefin Polymerization: Activators, Activation Processes, and Structure-Activity Relationships," Chem. Rev., 100, pp. 1391-1434.
Cipullo et al., (2009) "Improving the Behavior of Bis(phenoxyamine) Group 4 Metal Catalysts for Controlled Alkene Polymerization," Macromolecules 42 (12), pp. 3869-3872.
Crivello, J. V.; Jang, M., (2003) "Anthracene electron-transfer photosensitizers for onium salt induced cationic photopolymerizations," Journal of Photochemistry and Photobiology A: Chemistry,159 (2) ,pp. 173-188.
Crivello, J. V.; Jiang, F., (2002) "Photosensitized Onium-Salt-Induced Cationic Polymerization with Hydroxymethylated Polynuclear Aromatic Hydrocarbons,"Chemistry of Materials, 14 (11), 9 Pages.
Dadashi-Silab, S.; Doran, S.; Yacgci, Y.,(2016) "Photoinduced Electron Transfer Reasontions for Macromolecular Syntheses," Chem. Rev. , 116 (17), pp. 10213-10275.
Desert, X. et al., (2019), "Quantification of active sites in single-site group 4 metal olefin polymerization catalysis," Coord. Chem. Rev., 386,pp. 51-68.
Devi et al., (2012) "Synthesis, Spectral, and Thermal Characterization of Photoreactive Epoxy Resin Containing Cycloalkanone Moiety in the Main Chain," J Appl Polym Sci 2012,124 (1); 9 Pages.
Gao et al., (2015) "The ligand redox behavior and role in 1,2-bis[(2,6-diisoprpylphenyl)imino]-acenaphthene nickle—TMA(MAO) systems for ethylene polymerization," Chem. Commun., 51 (32), pp. 7004-7007.
Gill, J. M.; Hart A. S.,(2016) "Opening New Frontiers in the Development of Life Sciences Technology with Collarborative 3D Printing Technology," Jala-J Lab Autom., 21 (4); pp. 487-488.
Guan et al., (1999) "Chain Walking: A New Strategy to Control Polymer Topology,"Science, 283 (5410), pp. 2059-2062.

(Continued)

*Primary Examiner* — Jessica M Roswell
(74) *Attorney, Agent, or Firm* — Jenkins, Taylor & Hunt, P.A.

(57) ABSTRACT

A method of preparing a polyolefin is disclosed. In some examples, the method comprises contacting an olefin monomer with an olefin polymerization precatalyst and a photoacid generator (PAG) to provide an olefin polymerization mixture; and irradiating the olefin polymerization matrix for a first period of time with ultraviolet or visible light, activating the precatalyst to catalyze polymerization of the olefin monomer, thereby preparing a polyolefin. Additive manufacturing approaches employing the methods are also disclosed, as are ink compositions comprising an olefin polymerization precatalyst and a PAG.

19 Claims, 9 Drawing Sheets
(5 of 9 Drawing Sheet(s) Filed in Color)

(56) References Cited

OTHER PUBLICATIONS

Hegde, M, et al., (2017) "3-D Printing All-Aromatic Polyimides using Mask Projection Stereolithography: Processing the Nonprocessable," Adv. Mater., 29 (31); 7 Pages.

Hu, L. G.; Jiang, G. B., (2017) "3-D Printing Techniques in Environmental Science and Engineering Will Bring New innovation," Environ Sci. Technol, 51 (7); pp. 3597-3599.

Johnson et a., (1995) "New Pd(II)- and Ni(II)-Based Catalysts for Polymerization of Ethylene and a-Olefins," J. Am. Chem. Soc., 117 (23), pp. 6414-6415.

Kaiser, J. K., (2019), "A Dissertation Presented for the Doctor of Philosophy Degree," University of Tennessee, Knoxville, 180 Pages.

Kavarnos, G. J.; Turro, N. J.,(1986) "Photosensitization by Reversible Electron Transfer: Theories, Experimental Evience, and Examples," Chem. Rev., 86 (2), pp. 401-449.

Keitz et al.,(2009) "A Tandem Approach to Photoactivated Olefin Metathesis: Combining a Photoacid Generator with an Acid Activated Catalyst," J. Am. Chem. Soc., 131 (6), pp. 2038-2039.

Khalimon et al., (2012) "Photogeneration of a Phosphonium Alkylidene Olefin Metathesis Catalyst," Organometallics, 31 (15), pp. 5634-537.

Klikovits et al.,(2017), "Novel photoacid generators for cationic photopolymerization," Polym. Chem. , 8 (30), pp. 4414-4421.

Lalevée et al., (2015) "Recent Developments of Versatile Photointiating Systems for Cationic Ring Opening Polymerization Operating at Any Wavelengths and under Low Light Intensity Sources," Molecules, 20 (4), pp. 7201-7221.

Li et al., (2017) "A self-contained photoacid generator for super acid based on photochromic terarylene," Chem. Commun.,53 (31), pp. 4339-4341.

Ligon et al., (2017), "Polymers for 3-D Printing and Customized Additive Manufacturing," Chem. Rev., 117 (15), pp. 10213-10290.

Long et al., (2022) "Photoinduced Initiation of Olefin Polymerization: Enabling Spatial Control with Light," Journ. Amer. Chem. Soc.; 7 Pages.

Lorkovic et al., (1995) "Use of the Redox-Active Ligan I,I'-Bis(diphenylphosphino)cobaltocene To Reversibly Alter the Rate of the Rhodium(I)-Catalyzed Reduction and Isomerization of Ketones and Alkenes," J. Am. Chem. Soc. 1995,117(12), pp. 3617-3618.

Martin, C.J. et al. (2018) "Recent progress in development of photacid generators," Journal of Photochemistry and Photobiology C: Photochemistry Reviews, 34,pp. 42-51.

Moscato et al., (2012) "Mechanistic Investigations into the Behavior of a Labeled Zirconocene Polymerization Catalyst," Organometallics, 31, pp. 2097-2107.

Park et al., (2012) "Photoinitiated Cationic Polymerization of Limonene 1,2-Oxide and a-Pinene Oxide," J. Polym. Sci., Part A: Polym. Chem., 51 (1), pp. 109-117.

Phillips, et al.,(2019) "Sunlight Photodeploymerization of Transient Polymers," J Appl Polym Sci, 136 (9), pp. 12Pages.

Schnabel, W., (2000) "Cationic photopolymerization with the aid of pyridinium-type salts," Macromol Rapid Comm, 21 (10), pp. 628-642.

Shi et al., (2016) "Photoinitiating systems for cationic photopolymerization: Ongoing push toward long wavelengths and low light intensities," vol. 65, 40 Pages.

Shirai et al.,(1996), "Photoacid and Photobase Generators: Chemistry and Applications to Polymeric Materials," Prog Polym Sci, 21 (1), pp. 276y-45.

Tannous et al., (2002) "Gas-Phase Poylmerization of Ethylene Using Supported Metallocene Catalysts: Study of Polymerization Conditions," Marcomolecular Chemistry and Physics, 203 (13), pp. 1895-1905.

Toba, Y, et al. (1999) "Cationic Photopolymerization of Exopides by Direct and Sensitized Photolysis of Onium Tertrakis(pentafluorophenyl)borate Initiators," Macromolecules, 32 (10), pp. 3209-3215.

Turley, W. D.; Offen H. W., (1984) "Diffusion-Controlled Quenching in Solutions at High Pressures," The Journal of Physical Chemistry, 88 (16), pp. 3605-3607.

Vatamanu et al.,(2005) "An Investigation into the Identities and the Relative Concentrations of the Zr-Polymeryl Species Present during Ethylene and Propylene Polymerizations by Zirconocene-Based Ziegler Catalysts," Macromolecules, 38 (24), pp. 9944-9949.

Wang, et al. (2014), "Redox Control of Group 4 Metal Ring-Opening Polymerization Activity toward Lactide and Caprolactone," Journ. Amer. Chem. Soc. 136; pp. 11264-11267.

Xie et al.,(1994) "Gas Phase Ethylene Polymerization: Production Processes, Polymer Properties, and Reactor Modeling," Ind. Eng. Chem. Res., 33 (3), pp. 449-479.

Yeori et al., (2006) "Diastereomerically-Specific Zirconium Complexes of Chiral Salan Ligands: Isospecific Polymerization of 1-Hexene and 4-Methyl-1-pentene and Cyclopolymerization of 1,5-Hexadiene," J. Am. Chem. Soc., 128 (40), pp. 13062-13063.

\* cited by examiner

OLEFIN POLYMERIZATIONS AND PRINTING METHODS THEREOF

RELATED APPLICATIONS

The presently disclosed subject matter claims the benefit of U.S. Provisional Patent Application Ser. No. 62/821,634, filed Mar. 21, 2019; the disclosure of which is incorporated herein by reference in its entirety.

TECHNICAL FIELD

The presently disclosed subject matter relates to olefin polymerization methods and related three-dimensional printing methods.

BACKGROUND

Three-dimensional (3D) printing is a next-generation advanced/additive manufacturing tool that has the potential to revolutionize how scientists address real-world problems. When 3D printing polymeric materials, the scope of attainable physical, thermal, and mechanical properties can be restricted by a limited library of 3D printable monomers, polymers, and resins.

Due to their remarkable thermal and mechanical properties, polyolefins are the most widely produced and used polymers in the world. Despite their highly desirable properties, polyolefins are not amenable to standard methods of 3D printing, which has rapidly become a primary tool for the production of advanced device architectures and designer parts.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides a method of preparing a polyolefin. In some embodiments, the method comprises (a) contacting an olefin monomer with an olefin polymerization precatalyst and a photoacid generator (PAG) to provide an olefin polymerization mixture; and (b) irradiating the olefin polymerization matrix for a first period of time with ultraviolet or visible light, activating the precatalyst to catalyze polymerization of the olefin monomer, thereby preparing a polyolefin.

In some embodiments, the method further comprises quenching the olefin polymerization mixture after a second period of time by contacting the olefin polymerization mixture with air, alcohol, water, acid, or any organic solvent containing those species. In some embodiments, the method further comprises separating and/or collecting the polyolefin from the olefin polymerization mixture. In some embodiments, the separating and/or collecting comprises precipitating the polyolefin via the addition of air, alcohol, water, acid, or any organic solvent containing those species to the olefin polymerization mixture.

In some embodiments, the olefin monomer is selected from the group consisting of linear or branched $C_2$-$C_{12}$ alkenes, acrolein, an acrylate, a methacrylate, acrylonitrile, a vinyl ester, an aryl substituted alpha olefin, a styrene, a conjugated or unconjugated diene, a cyclic alkene, and any combination thereof. In some embodiments, the olefin monomer is a linear or branched $C_2$-$C_{12}$ alpha olefin or a mixture thereof.

In some embodiments, the precatalyst is selected from the group consisting of a metallocene precatalyst, a constrained geometry precatalyst, a monocyclopentadienyl amidinate precatalyst, a bisamidinate precatalyst, a diamine bis(phenolate) precatalyst, a pyridylamidohalfnium precatalyst, a phenoxyimine precatalyst, an α-diimine precatalyst, and a diamide ligated precatalyst.

In some embodiments, the PAG is selected from the group consisting of an ammonium or diazonium salt, a phosphonium salt, an alkyl, aryl, or allylic onium salt, a sulfonium salt, an iodonium salt, a ferrocenium complex or iron arene complex-based onium salt, a latent thermal/photoinduced onium salt, a bismuthonium salt comprising a pyrenyl group, a triazine compound, and compounds containing N—O bonds, benzyl carboxylates and benzyl sulfonates, and two photon absorbing compounds.

In some embodiments, the olefin polymerization mixture of (a) comprises about 0.05 mol % to about 200 mol % of the PAG compared to an amount of the precatalyst.

In some embodiments, the irradiating is performed with ultraviolet light.

In some embodiments, step (a) further comprises contacting the PAG with a photosensitizer, and wherein the irradiating of step (b) is performed with visible light or ultraviolet light. In some embodiments, the photosensitizer is selected from the group consisting of a benzodioxinone compound, a boron-dipyrromethene dye, a carbazole, a conjugated olefin, a cyanine dye, a diketopyrrolopyrole (DPP), a dithienothiophene, an isobenzofuran, a ketone, a metal carbonyl compound, a natural dye, a phenothiazine, a conjugated polynuclear aromatic compound, a quinoxaline, and an acridinedione. In some embodiments, the PAG is contacted with between about 0.01 molar equivalents and about 3 molar equivalents of the photosensitizer.

In some embodiments, prior to the irradiating of step (b), a portion of the surface of the solid substrate is covered with a photomask, thereby blocking irradiation of a portion of the residue, and wherein the irradiating provides a patterned polyolefin film.

In some embodiments, the olefin monomer is provided as a gas; wherein step (a) comprises:
  (a1) dissolving the PAG and the precatalyst in a solvent, thereby preparing a solution of the PAG and the precatalyst;
  (a2) depositing the solution on a surface of a solid substrate;
  (a3) evaporating the solvent to provide a residue comprising the PAG and the precatalyst; and
  (a4) contacting the residue with the olefin monomer; and
wherein the irradiating of step (b) provides a polyolefin film on the surface of the solid substrate.

In some embodiments, the solution of the PAG and the precatalyst further comprises a photosensitizer.

In some embodiments, the olefin monomer is provided as a liquid; wherein step (a) comprises:
  (a1) dissolving the PAG and the precatalyst in a solvent, thereby preparing a solution of the PAG and the precatalyst;

(a2) depositing the solution on a surface of a solid substrate;
(a3) evaporating the solvent to provide a residue comprising the PAG and the precatalyst; and
(a4) contacting the residue with the olefin monomer; and
wherein the irradiating of step (b) provides a polyolefin film on the surface of the solid substrate.

In some embodiments, the solution of the PAG and the precatalyst further comprises a photosensitizer.

In some embodiments, the method further comprises:
(c) depositing a composition comprising a PAG and a precatalyst on an exposed surface of the polyolefin film provided in step (b),
(d) contacting the composition comprising the PAG and the precatalyst with an olefin monomer, wherein said olefin monomer can be a same or different olefin monomer as the olefin monomer of step (a) to form a second olefin polymerization mixture; and
(f) irradiating the second olefin polymerization mixture for a period of time with ultraviolet or visible light, thereby activating the precatalyst to catalyze polymerization of the olefin monomer, thereby preparing a second polyolefin film, wherein the polyolefin film provided in step (b) and the second polyolefin film together form a multilayered polyolefin structure.

In some embodiments, the polyolefin film is removed from the solid substrate.

In some embodiments, the method further comprises repeating steps (a) to (b) to create subsequent layers of the polyolefin.

In some embodiments, a multilayered polyolefin product produced by the presently disclosed methods is provided.

In some embodiments, the presently disclosed subject matter provides an additive manufacturing method. In some embodiments, the method comprises (a) disposing a composition comprising an olefin polymerization precatalyst and a photoacid generator (PAG) on a surface of a solid substrate; (b) contacting the composition with an olefin monomer to provide an olefin polymerization mixture on the substrate; and (c) irradiating the olefin polymerization mixture for a first period of time with ultraviolet or visible light, activating the precatalyst to catalyze polymerization of the olefin monomer, thereby forming a first layer of a three-dimensional (3D) object on the substrate.

In some embodiments, the precatalyst is selected from the group consisting of a metallocene precatalyst, a constrained geometry precatalyst, a monocyclopentadienyl amidinate precatalyst, a bisamidinate precatalyst, a diamine bis(phenolate) precatalyst, a pyridylamidohalfnium precatalyst, a phenoxyimine precatalyst, an α-diimine precatalyst, and a diamide ligated precatalyst.

In some embodiments, the PAG is selected from the group consisting of an ammonium or diazonium salt, a phosphonium salt, an alkyl, aryl, or allylic onium salt, a sulfonium salt, an iodonium salt, a ferrocenium complex or iron arene complex-based onium salt, a latent thermal/photoinduced onium salt, a bismuthonium salt comprising a pyrenyl group, a triazine compound, and compounds containing N—O bonds, benzyl carboxylates and benzyl sulfonates, and two photon absorbing compounds.

In some embodiments, the composition of (a) comprises about 0.05 mol % to about 200 mol % of the PAG compared to an amount of the precatalyst.

In some embodiments, the olefin monomer is selected from the group consisting of a linear or branched $C_2$-$C_{12}$ alpha olefin or a mixture thereof, a linear or branched $C_2$-$C_{12}$ alkene, acrolein, an acrylate, a methacrylate, acrylonitrile, a vinyl ester, an aryl substituted alpha olefin, a styrene, a conjugated or unconjugated diene, a cyclic alkene, and any combination thereof. In some embodiments, the olefin monomer is provided in a liquid or as a gas.

In some embodiments, the composition of step (a) further comprises a photosensitizer, and wherein the irradiating of step (b) is performed with ultraviolet or visible light. In some embodiments, the photosensitizer is selected from the group consisting of a benzodioxinone compound, a borondipyrromethene dye, a carbazole, a conjugated olefin, a cyanine dye, a diketopyrrolopyrole (DPP), a dithienothiophenes, an isobenzofuran, a ketone, a metal carbonyl compound, a natural dye, a phenothiazine, a conjugated polynuclear aromatic compound, a quinoxaline, and an acridinedione.

In some embodiments, prior to the irradiating of step (c), a portion of the surface of the solid substrate is covered with a photomask, thereby blocking irradiation of a portion of the residue, and wherein the irradiating provides a patterned first layer of a 3D object on the surface of the solid substrate.

In some embodiments, the olefin monomer is provided as a gas; wherein step (a) comprises:
(a1) dissolving the PAG and the precatalyst in a solvent, thereby preparing a solution of the PAG and the precatalyst;
(a2) depositing the solution on a surface of a solid substrate; and
(a3) evaporating the solvent to provide a residue comprising the PAG and the precatalyst; and
wherein step (b) comprises
(b1) contacting the residue with the olefin monomer; and
wherein the irradiating of step (c) provides a first layer of a 3D object on the surface of the solid substrate.

In some embodiments, the solution of the PAG and the precatalyst further comprises a photosensitizer.

In some embodiments, the olefin monomer is provided as a liquid; wherein step (a) comprises:
(a1) dissolving the PAG and the precatalyst in a solvent, thereby preparing a solution of the PAG and the precatalyst;
(a2) depositing the solution on a surface of a solid substrate; and
(a3) evaporating the solvent to provide a residue comprising the PAG and the precatalyst; and
wherein step (b) comprises
(b1) contacting the residue with the olefin monomer; and
wherein the irradiating of step (c) provides a first layer of a 3D object on the surface of the solid substrate.

In some embodiments, the solution of the PAG and the precatalyst further comprises a photosensitizer.

In some embodiments, the method further comprises:
(c) depositing a composition comprising a PAG and a precatalyst on an exposed surface of the first layer of the 3D object provided in step (c),
(d) contacting the composition comprising the PAG and the precatalyst with an olefin monomer, wherein said olefin monomer can be a same or different olefin monomer as the olefin monomer of step (b) to form a second olefin polymerization mixture; and
(f) irradiating the second olefin polymerization mixture for a period of time with ultraviolet or visible light, thereby activating the precatalyst to catalyze polymerization of the olefin monomer, thereby preparing a second layer of the 3D object, to thereby form a multilayered polyolefin 3D object.

In some embodiments, the method further comprises repeating steps (a) to (c) to create subsequent layers of the 3D object. In some embodiments, the 3D object is removed from the solid substrate.

In some embodiments, a multilayer polyolefin 3D object produced by an additive manufacturing process in accordance with the presently disclosed subject matter is provided.

In some embodiments, the presently disclosed subject matter provides an ink composition for use in an additive manufacturing process. In some embodiments, the ink composition comprises a precatalyst and a photoacid generator (PAG).

In some embodiments, the precatalyst is selected from the group consisting of a metallocene precatalyst, a constrained geometry precatalyst, a monocyclopentadienyl amidinate precatalyst, a bisamidinate precatalyst, a diamine bis(phenolate) precatalyst, a pyridylamidohalfnium precatalyst, a phenoxyimine precatalyst, an α-diimine precatalyst, and a diamide ligated precatalyst.

In some embodiments, the PAG is selected from the group consisting of an ammonium or diazonium salt, a phosphonium salt, an alkyl, aryl, or allylic onium salt, a sulfonium salt, an iodonium salt, a ferrocenium complex or iron arene complex-based onium salt, a latent thermal/photoinduced onium salt, a bismuthonium salt comprising a pyrenyl group, a triazine compound, and compounds containing N—O bonds, benzyl carboxylates and benzyl sulfonates, and two photon absorbing compounds.

In some embodiments, the composition comprises about 0.05 mol % to about 200 mol % of the PAG compared to an amount of the precatalyst.

In some embodiments, the ink composition further comprises an olefin monomer. In some embodiments, the olefin monomer is selected from the group consisting of a linear or branched $C_2$-$C_{12}$ alpha olefin or a mixture thereof, a linear or branched $C_2$-$C_{12}$ alkene, acrolein, an acrylate, a methacrylate, acrylonitrile, a vinyl ester, an aryl substituted alpha olefin, a styrene, a conjugated or unconjugated diene, a cyclic alkene, and any combination thereof.

In some embodiments, the ink composition further comprises a photosensitizer. In some embodiments, the photosensitizer is selected from the group consisting of a benzodioxinone compound, a boron-dipyrromethene dye, a carbazole, a conjugated olefin, a cyanine dye, a diketopyrrolopyrole (DPP), a dithienothiophenes, an isobenzofuran, a ketone, a metal carbonyl compound, a natural dye, a phenothiazine, a conjugated polynuclear aromatic compound, a quinoxaline, and an acridinedione.

In some embodiments, the presently disclosed subject matter provides a multilayered polyolefin structure or a multilayered polyolefin 3D object. In some embodiments, the structure or object is prepared by an additive manufacturing technique, which in some embodiments is exemplified by the methods and compositions of the presently disclosed subject matter. In some embodiments, the multilayered polyolefin structure or a multilayered polyolefin 3D object comprises a first polyolefin layer and one or more additional polyolefin layers disposed on the first layer. In accordance with the additive manufacturing techniques, the one or more additional layers can be sequentially disposed on each other. In embodiments, the one or more additional layers are conformal layers, patterned layers, or combinations thereof. In some embodiments, the one or more additional layers can comprise the same or different polyolefin as the first layer. In some embodiments, in a multilayered polyolefin structure or a multilayered polyolefin 3D object, one or more layers can comprise a material other than a polyolefin.

It is an object of the presently disclosed subject matter to provide olefin polymerization methods, compositions employed and/or produced by the methods, and printing methods employing the same. An object of the presently disclosed subject matter having been stated hereinabove, and which is achieved in whole or in part by the presently disclosed subject matter, other objects will become evident as the description proceeds when taken in connection with the accompanying drawings and examples as best described herein below.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
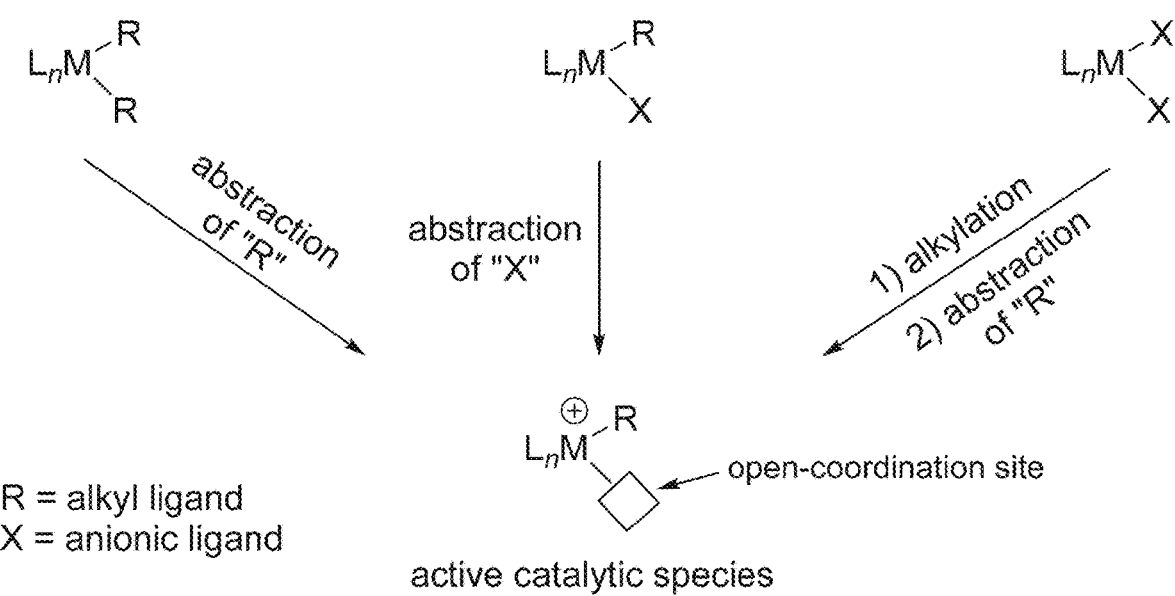
FIG. 1 is a schematic showing classical methods to access the active olefin polymerization catalytic species.

The ability to generate usable materials and devices via an additive manufacturing technique such as three-dimensional (3D) printing has become an incredibly relevant topic in both industry and academia alike. Perhaps the most popular 3D printing methods for polymers are fused deposition modeling (FDM), stereolithography (SLA), and digital light processing (DLP) techniques. While these methods are routinely used in industrial, academic, and even hobbyist settings, they are each restricted by the narrow library of either extrudable polymeric materials (for FDM) or monomers/resins that are capable of undergoing photoinitiated polymerization or cross-linking (for SLA and DLP). Unfortunately, this limited catalog does not include olefinic monomers, such as ethylene, propylene, and higher α-olefins. These olefinic monomers are among the cheapest and most versatile feedstocks known today and are the essential building blocks of polyolefins, the world's most versatile and widely produced polymers.

The presently disclosed subject matter provides a methodology by which polyolefins can be 3D printed via light-activated olefin polymerization. In some embodiments, this is accomplished in the gas-phase polymerization of ethylene and higher α-olefins. In some embodiments, the presently disclosed subject matter employs group 4 and group 10 olefin polymerization precatalysts in conjunction with a photoacid generator. Because this is a light-activated process, both temporal and spatial control is realized. Such control enables the user to dictate when and where polyolefins are grown or deposited, which is an aspect of a light-mediated 3D printing technique and also facilitates the printing of precisely defined polyolefin layers and features. Additionally, the presently disclosed subject matter demonstrates that this light-activated olefin polymerization methodology can be utilized to 3D print structures from polyethylene, polypropylene, poly(1-hexene), and any other olefinic monomer. The presently disclosed subject matter describes that both UV and visible light sources can be used, and that the rates of both the light-activation and the polyolefin printing processes can be increased via the addition of photosensitizer.

The presently disclosed subject matter will now be described more fully hereinafter with reference to the accompanying Examples and Figures, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a solvent" includes a plurality or mixture of solvents, and so forth.

Unless otherwise indicated, all numbers expressing quantities of size, weight, percentage, temperature or other reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, weight, concentration, temperature, percentage, or the like is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause, other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer.

A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

For example, a diblock copolymer of polybutadiene and polystyrene is referred to as polybutadiene-block-polystyrene. Such a copolymer is referred to generically as an "AB block copolymer." Likewise, a triblock copolymer can be represented as "ABA." Other types of block polymers exist, such as multiblock copolymers of the $(AB)_n$ type, ABC block polymers comprising three different blocks, and star block polymers, which have a central point with three or more arms, each of which is in the form of a block copolymer, usually of the AB type.

A "branch point" (or "junction point") refers to a point on a chain (e.g., a main chain) at which a branch is attached. A "branch," also referred to as a "side chain," "graft," or "pendant chain," is an oligomeric or polymeric offshoot from a macromolecule chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "main chain" or "backbone" refers to a linear chain from which all other chains are regarded as being pendant.

A "side chain" refers to a linear chain which is attached to a main chain at a branch point.

An "end group" (or "terminal group") refers to a constitutional unit that comprises the extremity of a macromolecule or oligomer and is attached to only one constitutional unit of a macromolecule or oligomer.

Polydispersity (PDI) or dispersity (D) refers to the ratio $(M_w/M_n)$ of a polymer sample. $M_w$ refers to the mass average molar mass (also commonly referred to as weight average molecular weight). $M_n$ refers number average molar mass (also commonly referred to as number average molecular weight).

"Allylic" refers to a carbon atom bonded to a carbon atom that in turn is doubly bonded to another carbon atom. An allylic carbon as used herein can be part of an "alkyl" group, "substituted alkyl" group, "aryl group" or "substituted aryl" group as defined herein.

As used herein the term "alkyl" can refer to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, benzyl, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 3 to about 10 carbon atoms, e.g., 3, 4, 5, 6, 7, 8, 9, or 10 carbon atoms, and including 5- and 6-membered hydrocarbon and heterocyclic aromatic rings.

"Heteroatom" as used herein refers to any element or atom other than carbon.

The term "heterocycle" is used herein to refer to a non-conjugated cyclic substituent that contains one or more heteroatoms within the cyclic unit. In particular embodiments, the term "heterocycle" means a cyclic unit comprising about 3 to about 10 carbon atoms, e.g., 3, 4, 5, 6, 7, 8, 9, or 10 carbon atoms, and including 5- and 6-membered rings. In some embodiments, the term "heterocycle" means a cyclic unit containing one or more unsaturated unit, such as a double or triple bond, but that are not conjugated.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo (also referred to as "haloaryl"), nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

"Heteroaryl" as used herein refers to an aryl group that contains one or more non-carbon atoms (e.g., O, N, S, Se, etc) in the backbone of a ring structure. Nitrogen-containing heteroaryl moieties include, but are not limited to, pyridine, imidazole, benzimidazole, pyrazole, pyrazine, triazine, pyrimidine, and the like.

"Aralkyl" refers to an -alkyl-aryl group, optionally wherein the alkyl and/or aryl moiety is substituted (e.g., with an alkyl or aryl group substituent).

The terms "halo", "halide", or "halogen" as used herein refer to fluoro, chloro, bromo, and iodo groups.

The term "hydroxyl" refers to the —OH group.

The terms "mercapto," "mercaptan," and "thiol" refer to compounds comprising the group —SH or —SR, wherein R is alkyl, substituted alkyl, aralkyl, substituted aralkyl, aryl, and substituted aryl.

The term "vinyl" can refers to the group —CH=CH$_2$. However, as used herein, unless specified otherwise, the term "vinyl" can also refer to any alkenyl group (i.e., any group containing a carbon-carbon double bond).

The term "cyano" refers to the group —C≡N.

The terms "carboxylate" and "carboxylic acid" can refer to the groups —C(=O)O— and —C(=O)OH, respectively or to molecules containing such groups, such as benzoic acid or alkanoic acids (e.g., hexanoic acid, butanoic acid), etc. Derivatives of carboxylic acid groups include, but are not limited to, acid halides (also known as acyl halides, e.g., acid or acyl chlorides), anhydrides, esters, or amides, i.e., compounds wherein the —OH of the carboxylic acid group is replaced by -X, —OC(=O)R, OR, or NRR', respectively, wherein X is a halide, and R and R' are each H, alkyl, substituted alkyl, aralkyl, substituted aralkyl, aryl or substituted aryl.

The term "ester" refers to a group or compound containing a group having the structure: R'—C(=O)—O—R, wherein each of R and R' are selected from alkyl, substituted alkyl, aralkyl, substituted aralkyl, aryl, and substituted aryl.

The term "amide" refers to a group or compound containing a group having the structure: R'—C(=O)—NRR", wherein each of R and R' are selected from alkyl, substituted alkyl, aralkyl, substituted aralkyl, aryl, and substituted aryl and wherein R" is H, alkyl, substituted alkyl, aralkyl, substituted aralkyl, aryl, or substituted aryl. In some embodiments, R" is H.

The term "alkyl acrylate" refers to a compound having the formula CH$_2$=CHC(=O)OR, wherein R is an alkyl or substituted alkyl group. In some embodiments, "alkyl acrylate" refers to a compound of the formula CH$_2$=CHC(=O)OR, wherein R is a C$_1$-C$_6$ alkyl group.

The term "onium" refers to a cation formally obtained by the protonation of mononuclear parent hydride of a pnictogen (group 15 of the periodic table), chalcogen (group 16), or halogen (group 17).

II. General Considerations

The majority of homogeneous olefin polymerization pre-catalysts are inherently polymerization inactive and must be activated by an added chemical reagent, only then becoming active catalysts. This added reagent is often referred to as a "cocatalyst" or "activator" (Guan et al., *Science* 1999, 283 (5410), 2059-62; Lorkovic et al., *J. Am. Chem. Soc.* 1995, 117 (12), 3617-3618; Anderson et al., *J. Am. Chem. Soc.* 2016, 138 (3), 774-7. Camacho et al., *J. Am. Chem. Soc.* 2014, 136 (32), 11264-7; Busico et al., *Macromolecules* 2003, 36 (11), 3806-3808; Johnson et al., *J. Am. Chem. Soc.* 1995, 117 (23), 6414-6415. Homogeneous olefin polymerization catalysts, regardless of the ligand backbone design, employ an open-coordination site and an orthogonal alkyl, aryl, or hydride group to insert monomers via coordination-insertion. There are three classical methods, depending on the labile ligand design, to generate the active catalytic species: abstraction of an alkyl ligand, abstraction of an anionic ligand (e.g. halide), and alkylation with subsequent abstraction (FIG. 1).

Abstraction of an alkyl ligand can occur using a variety of different chemical reagents, such as trityl borates, boranes, anilinium borates, or oxonium acids (Chen, E. Y-X.; Marks, T. J., *Chem. Rev.* 2000, 100, 1391-1434; Berman, B., *Bus Horizons* 2012, 55 (2), 155-162; Gill, J. M.; Hart, A. S., *Jala-J Lab Autom* 2016, 21 (4), 487-488; Hu, L. G.; Jiang, G. B., *Environ Sci Technol* 2017, 51 (7), 3597-3599; Hegde, M.; Meenakshisundaram, V.; Chartrain, N.; Sekhar, S.; Tafti, D.; Williams, C. B.; Long, T. E., *Adv. Mater.* 2017, 29 (31); Bhushan, B.; Caspers, M., *Microsyst Technol* 2017, 23 (4), 1117-1124; Ligon et al., *Chem. Rev.* 2017, 117 (15), 10212-10290). Trityl borates and borane reagents behave as Lewis acids and accept the electrons from the M-R bond, generating a cationic metal center. Anilinium borates and oxonium acid derivatives behave like Brønsted acids and protonate the alkyl ligand, resulting in the formation of an active species (Berman, B., *Bus Horizons* 2012, 55 (2), 155-162). In the instance where both an alkyl and anionic ligand surround a metal center, the precatalyst is activated by substitution of the anionic ligand with a non-coordinating anion by elimination of a salt. Popular activating reagents include sodium tetraarylborate salts or silver salts (e.g. AgBF$_4$ and AgOTf), depending on the identity of the precatalyst metal-center. If there are two anionic, labile ligands present, then a two-step activation is required starting with the alkylation of the metal center followed by alkyl abstraction. Reaction of the precatalyst with trialkyl aluminum species followed by the addition of any Lewis/Brønsted acid reagent discussed above are proficient at generating an open-coordination site; however, tetraalkyl aluminum halides and MAO reagents are effective at conducting both processes leading to active catalytic species with improved lifetimes (Khalimon et al., *Organometallics* 2012, 31 (15), 5634-5637; Keitz et al., *J. Am. Chem. Soc.* 2009, 131 (6), 2038; Li et al., *Chem. Commun.* 2017, 53 (31), 4339-4341; Klikovits et al., *Polym. Chem.* 2017, 8 (30), 4414-4421). It is noted that MAO is also an efficient activator for $L_nMR_2$ olefin polymerization catalysts because it is a strong Lewis acid.

Since the olefin polymerization catalytic species is cationic, it is desirable to select proper activating reagents that contain non-coordinating anions to complete the ion pair and ensure optimal catalytic activity and longevity. At the time cationic coordination-insertion catalysis emerged, there was already a catalog of non-coordinating counterions for organometallic complexes (Devi et al., *J Appl Polym Sci* 2012, 124 (1), 58-66; Shirai et al., *Prog Polym Sci* 1996, 21 (1), 1-45; Chen et al., *Chem. Rev.* 2000 100, 1391; Moscato et al., *Organometallics* 2012, 31, 2097-2107; Press, K., et al., *Angew. Chem. Int. Edit.* 2011, 50 (15), 3529-3532). Initially, $[BF_4]^-$ and $[PF_6]^-$ were attractive counterions because of their low reactivity and non-nucleophilic character, but Jordan and coworkers reported the deactivation of a zirconium metallocene by fluoride abstraction from a $[PF_6]^-$ anion as a product of a tight ion pair association (Yeori et al., *J. Am. Chem. Soc.* 2006, 128 (40), 13062-13063). To prevent this ion-pair association between the cationic metal center and counterion, fluorine atoms were used to decorate the aromatic rings to minimize the nucleophilic nature of the anion via an inductive effect (Busico et al., *Macromolecules* 2004, 37 (22), 8201-8203). These fluorophenylborate complexes permitted the isolation and investigation of highly catalytically active species, which in turn aided in an improved understanding of these intriguing organometallic complexes for polyolefin synthesis (Ligon et al., *Chem. Rev.* 2017, 117 (15), 10212-10290).

While each of these activation methods have found utility in the field of olefin polymerizations, they do not permit spatially and/or temporally controlled activation via an external stimulus. The ability to use this type of control over the polyolefin activation process would be very advantageous to other applications because of the innate abundant olefin monomer feedstock and the ability to access a variety of polymer architectures with distinct mechanical properties. In accordance with aspects of the presently disclosed subject matter, light is employed to initiate protonolysis of alkyl ligands bound to a precatalyst to initiate olefin polymerization, demonstrating that olefins belong in the 3D printing monomer catalog.

The ability to generate usable materials and devices via three-dimensional (3D) printing has become an incredibly relevant field of research in both industry and academia alike (Cipullo et al., *Macromolecules* 2009 42 (12), 3869-3872; Xie et al., *Ind. Eng. Chem. Res.* 1994, 33 (3), 449-479; Tannous et al., *Macromolecular Chemistry and Physics* 2002, 203 (13), 1895-1905). Perhaps the most readily accessible and popular 3D printing method for polymers is fused deposition modeling (FDM). FDM involves the extrusion of a polymer filament in a line-by-line manner to form a targeted structure. While FDM is routinely used in industrial, academic, and even hobbyist settings, it has a restricted range of extrudable polymeric materials and limited fine-detail resolution. In contrast, 3D printing via stereolithography (SLA) and dynamic light processing (DLP) methods have attracted significant interest due to their enhanced printing precision and versatility. Both SLA and DLP use light projection that induces polymerization or cross-linking of a liquid resin to form their desired features (Crivello et al., *Anthracene electron-transfer photosensitizers for onium salt induced cationic photopolymerizations.* 2003; Vol. 159, p 173-188; Park et al., *J. Polym. Sci., Part A: Polym. Chem.* 2013, 51 (1), 109-117).

Though SLA and DLP printing both demonstrate an impressive ability to produce detailed and complex 3D printed structures, they are limited to a restricted monomer/resin catalog, which contains only those species capable of undergoing photoinitiated polymerization or cross-linking (Lalevée et al., *Molecules* 2015, 20 (4), 7201-7221). Unfortunately, these requirements disqualify olefinic monomers such as ethylene, propylene, and higher α-olefins from being eligible 3D printed materials. These monomers are among the cheapest and most versatile feedstocks known today and are the building blocks of polyolefins, the world's most widely produced polymers. To enable the 3D printing of polyolefins via SLA or DLP-like methods, corresponding chemistries must be developed that will facilitate the photoinduced polymerization of ethylene and higher α-olefins.

In an effort to fill this gap in current capabilities, the presently disclosed subject matter provides the development of photoinduced olefin polymerizations. In some embodiments of the presently disclosed subject matter, this is accomplished via the combination of an olefin polymerization precatalyst, a photoacid generator (PAG), and exposure to UV or visible light. Because this is a photoinduced process, it is able to provide both spatial and temporal resolution of the polymerization process. Also, approaches in accordance with the presently disclosed subject matter represent the first example in which light is used to initiate the coordination-insertion polymerization of ethylene and higher α-olefins. In some embodiments, the presently disclosed subject matter also provides methods for "printing" polyolefins and generating layered conformal polyolefin films via light activated, gas phase polymerizations.

III. Exemplary Embodiments

Due to their remarkable thermal and mechanical properties, polyolefins are the most widely produced and used polymers in the world. Despite their highly desirable properties, polyolefins are not amenable to standard methods of additive manufacturing, such as 3D printing, which has rapidly become a primary tool for the production of advanced device architectures and designer parts. To address this issue, among other issues, the presently disclosed subject matter provides new chemistries that facilitate the 3D printing of polyolefins using a gas phase, olefin polymerization process. In some embodiments, the presently disclosed subject matter provides a methodology that employs photo-activated olefin polymerization catalysts, and that provides the ability to grow, print, and pattern conformal polyolefin films.

Accordingly, in some embodiments, the presently disclosed subject matter provides methods of preparing a polyolefin. In some embodiments, the method comprises (a) contacting an olefin monomer with an olefin polymerization precatalyst and a photoacid generator (PAG) to provide an olefin polymerization mixture; and (b) irradiating the PAG containing olefin polymerization for a first period of time with ultraviolet or visible light, thereby activating the precatalyst to catalyze polymerization of the olefin monomer, thereby preparing a polyolefin. In some embodiments, steps (a) and (b) are repeated to create subsequent layers of the polyolefin.

In some embodiments, an additive manufacturing method is provided in accordance with the presently disclosed subject matter. In some embodiments, the additive manufacturing method comprises (a) disposing a composition comprising an olefin polymerization precatalyst and a photoacid generator (PAG) on a surface of a solid substrate; (b) contacting the composition with an olefin monomer to provide an olefin polymerization mixture on the substrate; and (c) irradiating the olefin polymerization mixture for a first period of time with ultraviolet or visible light, activating the precatalyst to catalyze polymerization of the olefin monomer, thereby forming a first layer of a three-dimensional (3D) object on the substrate. In some embodiments, steps (a) to (c) are repeated to create subsequent layers of the 3D object. In some embodiments, the 3D object is removed from the solid substrate. In some embodiments, the method is carried out in any apparatus or system configured for carrying out an additive manufacturing process as would be apparent to one of ordinary skill in the art upon a review of the instant disclosure. Non-limiting configurations for systems are also described in the Examples presented below. Other examples of systems include commercially available systems for carrying out 3D printing methods, such as stereolithography (SLA) and digital light processing (DLP) systems commercially available from 3D Systems (www.3dsystems.com), Carbon (wwww.carbon3d.com), and Formlabs (formlab.com).

In some embodiments, the method further comprises separating and/or collecting the polyolefin from the olefin polymerization mixture. In some embodiments, the separating and/or collecting comprises precipitating the polyolefin via air, alcohol, water, acid, or any organic solvent containing those species to the olefin polymerization mixture. That is, the organic solvent can be any organic solvent that contains dissolved air/oxygen, an alcohol, and/or water. Representative examples of organic solvents include dichloromethane, toluene, methanol, ethanol, hexanes, heptane, or any other aliphatic or aromatic hydrocarbon.

In some embodiments, the olefin monomer is provided as a liquid or as a gas. In some embodiment, the olefin monomer is selected from the group comprising a linear or branched $C_2$-$C_{12}$ alkenes, acrolein, an acrylate, a methacrylate, acrylonitrile, a vinyl ester, an aryl substituted alpha olefin, a styrene, a conjugated or unconjugated diene, a cyclic alkene, and any combination thereof. In some embodiments, the olefin monomer is any linear or branched $C_2$-$C_{12}$ alpha olefin or a mixture thereof. In some embodiments, the olefin monomer is selected from ethylene, propylene, and 1-hexene. In some embodiments, the olefin monomer is a $C_3$ alpha olefin or longer.

In some embodiments, the precatalyst is selected from the group comprising a metallocene precatalyst, a constrained geometry precatalyst, a monocyclopentadienyl amidinate precatalyst, a bisamidinate precatalyst, a diamine bis(phenolate) precatalyst, a pyridylamidohalfnium precatalyst, a phenoxyimine precatalyst, an α-diimine precatalyst, and a diamide ligated precatalyst. In some embodiments, the precatalyst is a metallocene catalyst or a diamine bis(phenolate) catalyst. In some embodiments, the precatalyst is selected from the group comprising dimethylbis[indenyl] zirconium, salan ligated zirconium; and dimethylbis(tert-butylcyclopentadienyl) halfnium.

Non-limiting examples of precatalysts include the following:

Precatalysts:

Metallocene Precatalysts

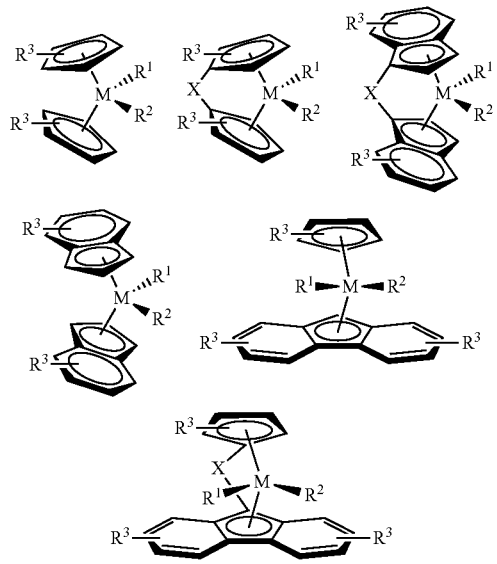

M=Ti, Zr, Hf $R^1$=H, methyl, benzyl, alkyl, aryl, halide $R^2$=H, methyl, benzyl, alkyl, aryl, halide $R^3$=any number and combination of H, methyl, alkyl, aryl, halide, heteroatom, heteroaryl, heterocycle X=Si(alkyl)$_2$, Si(aryl)$_2$, Si(alkyl)(aryl), SiH$_2$, SiMe$_2$, C(alkyl)$_2$, C(aryl)$_2$, C(alkyl)(aryl), CH$_2$, CMe$_2$ Constrained Geometry Precatalysts (CGC)

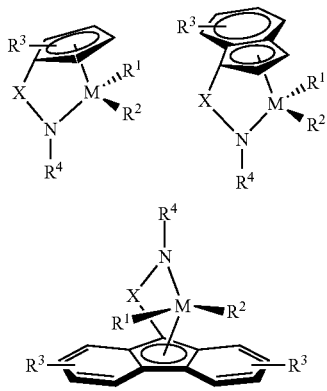

M=Ti, Zr, Hf $R^1$=H, methyl, benzyl, alkyl, aryl, halide $R^2$=H, methyl, benzyl, alkyl, aryl, halide $R^3$=any number and combination of H, methyl, alkyl, aryl, halide, heteroatom, heteroaryl, heterocycle X=Si(alkyl)$_2$, Si(aryl)$_2$, Si(alkyl)(aryl), SiH$_2$, SiMe$_2$, C(alkyl)$_2$, C(aryl)$_2$, C(alkyl)(aryl), CH$_2$, CMe$_2$

17

Monocyclopentadienyl Amidinate Precatalysts

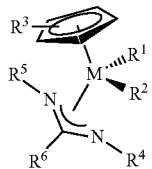

M=Ti, Zr, Hf
R[1]=H, methyl, alkyl, benzyl, aryl, halide
R[2]=H, methyl, alkyl, benzyl, aryl, halide
R[3]=any number and combination of H, methyl, alkyl, aryl, halide, heteroatom, heteroaryl, heterocycle
R[4]=alkyl, aryl
R[5]=alkyl, aryl
R[6]=H, alkyl, aryl Bisamidinate Precatalysts

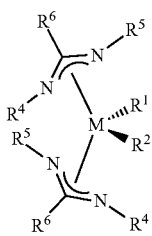

M=Ti, Zr, Hf
R[1]=H, methyl, alkyl, benzyl, aryl, halide
R[2]=H, methyl, alkyl, benzyl, aryl, halide
R[4]=alkyl, aryl
R[5]=alkyl, aryl
R[6]=H, alkyl, aryl Diamine Bis(phenolate) Precatalysts

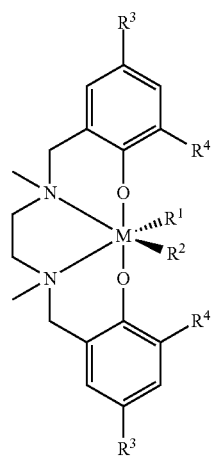

M=Ti, Zr, Hf
R[1]=H, methyl, alkyl, benzyl, aryl, halide
R[2]=H, methyl, alkyl, benzyl, aryl, halide
R[3]=H, methyl, alkyl, aryl
R[4]=H, methyl, alkyl, aryl

18

Pyridylamidohafnium Precatalysts

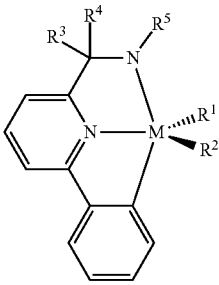 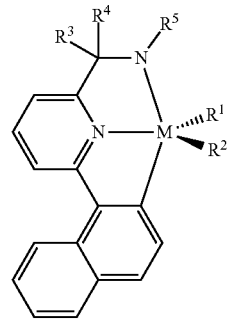

M=Ti, Zr, Hf
R[1]=H, methyl, alkyl, benzyl, aryl, halide
R[2]=H, methyl, alkyl, benzyl, aryl, halide
R[3]=H, methyl, alkyl, aryl
R[4]=H, methyl, alkyl, aryl
R[5]=methyl, alkyl, aryl Phenoxyimine Precatalysts

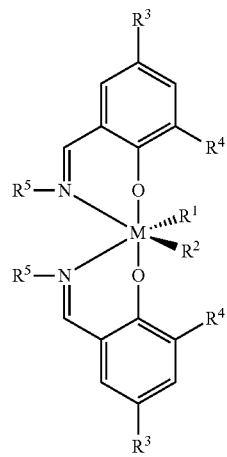

M=Ti, Zr, Hf
R[1]=H, methyl, alkyl, benzyl, aryl, halide
R[2]=H, methyl, alkyl, benzyl, aryl, halide
R[3]=H, methyl, alkyl, aryl
R[4]=H, methyl, alkyl, aryl
R[5]=methyl, alkyl, aryl, haloaryl α-Diimine Precatalysts

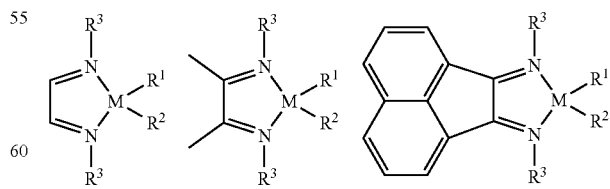

M=Ni, Pd
R[1]=H, methyl, alkyl, benzyl, aryl, halide
R[2]=H, methyl, alkyl, benzyl, aryl, halide
R[3]=alkyl, aryl Diamide Ligated Precatalysts

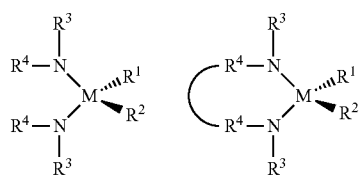

M=Ti, Zr, Hf
R$^1$=H, methyl, alkyl, benzyl, aryl, halide
R$^2$=H, methyl, alkyl, benzyl, aryl, halide
R$^3$=methyl, alkyl, aryl
R$^4$=H, methyl, alkyl, aryl, silyl Other precatalysts are described in the Examples presented herein below.

In some embodiments, the PAG is selected from the group comprising an ammonium or diazonium salt, a phosphonium salt, an alkyl, aryl, or allylic onium salt, a sulfonium salt, an iodonium salt, a ferrocenium complex or iron arene complex-based onium salt, a latent thermal/photoinduced onium salt, a bismuthonium salt comprising a pyrenyl group, a triazine compound, compounds containing N—O bonds, benzyl carboxylates and benzyl sulfonates, and two photon absorbing compounds. In some embodiments, the iodonium salt is 4-isopropyl-4'-methyldiphenyliodonium tetrakis(pentafluorophenyl)borate.

Non-limiting examples of PAGs include the following:

Diazonium, ammonium, phosphonium, and allylic onium salts: Examples: N-alkoxy pyridinium salts, phenacyl ammonium salts

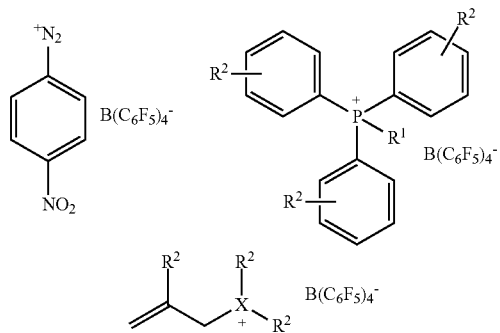

R$^1$=H, methyl, alkyl, aryl, halide, heteroatom, heteroaryl, heterocycle
R$^2$=any number and combination of H, methyl, alkyl, aryl, halide, heteroatom, heteroaryl, heterocycle
X=O, S, NR$^1$, PR$^1$ Sulfonium salts: Examples include triarylsulfonium salts, aryl-alkylsulfonium salts, phenacylsulfonium salts

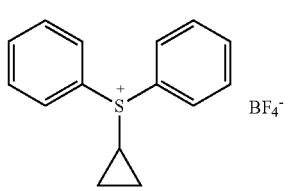

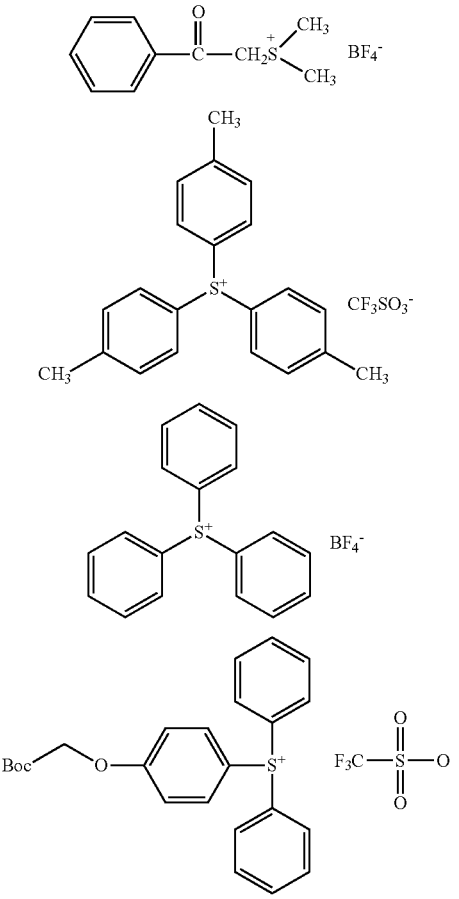

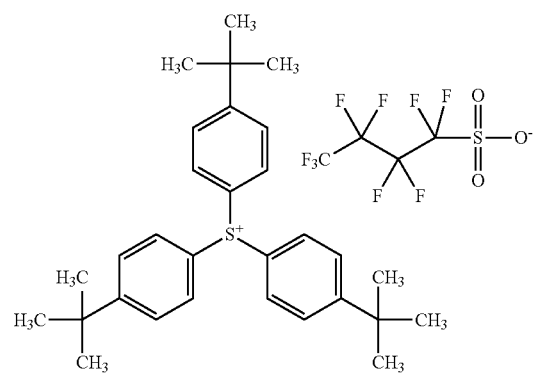

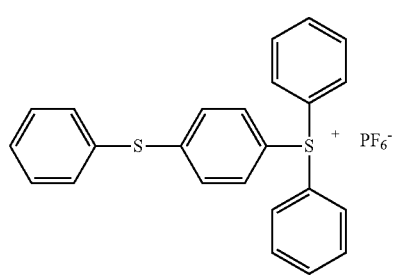

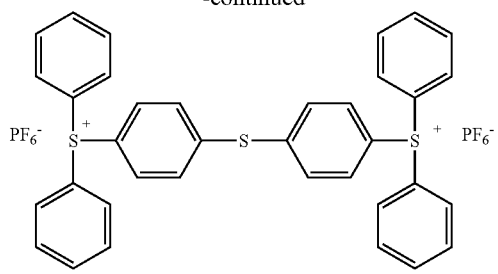

Iodonium salts

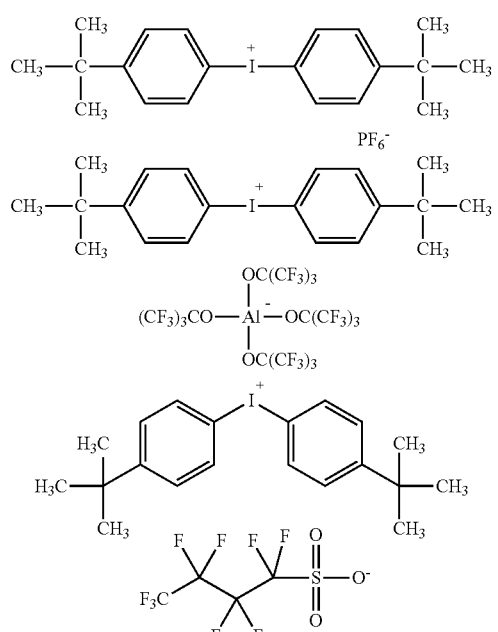

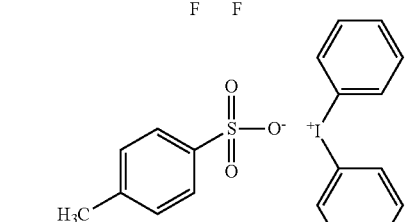

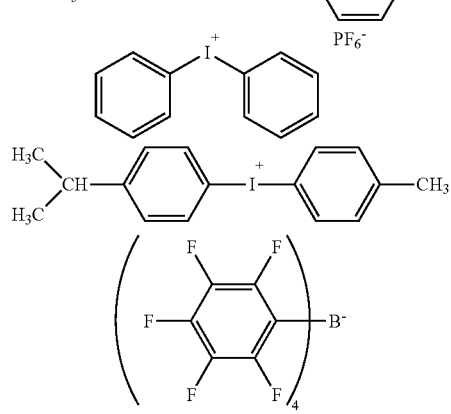

Latent thermal/photoinduced onium salts, reviewed in Kahveci M U, Yilmaz A G, Yagci Y. Photoinitiated cationic polymerization: reactivity and mechanistic aspects. In: Allen N S, editor. Photochemistry and photophysics of polymer materials. New Jersey: John Wiley & Sons Inc.; 2010. p. 421-77

Bismuthonium salts bearing a pyrenyl light-absorbing group

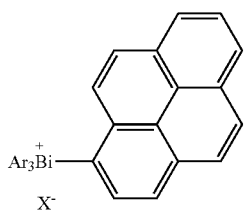

$X^-$=any anion

Ferrocenium-based complexes and Iron-arene complex-based onium salts

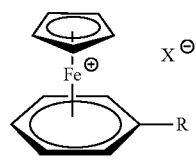

R=H, methyl, alkyl, aryl, halo
$X^-$=any anion

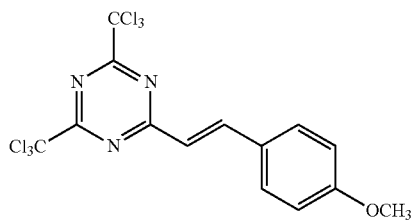

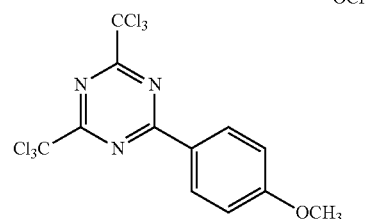

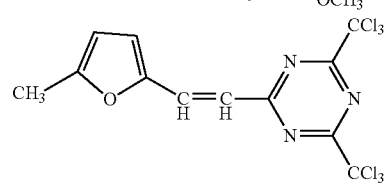

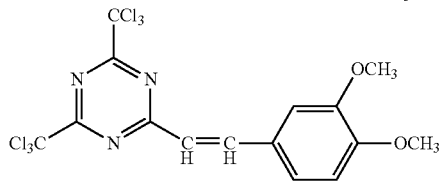

Compounds containing N—O bonds, such as imino esters and conjugated imino esters as defined in Martin, C. J.; Rapenne, G.; Nakashima, T.; Kawai, T. Journal of Photochemistry and Photobiology C: Photochemistry Reviews 2018, 34, 41-51. Examples include oxime-sulfonates, hydroxylamines, imino sulfates, N-oxysuccinimidoaryl sulfonates, N-oxyimido sulfonate esters, N-hydroxynapthalimides, N-hydroxyanthracene-1,9-dicarboxymides, N-hydroxyimide sulfonates, N-Hydroxy-5-norbornene-2,3-dicarboximides

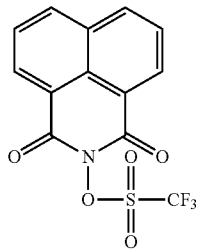

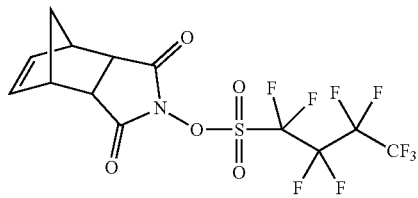

Benzyl carboxylates and benzyl sulfonates

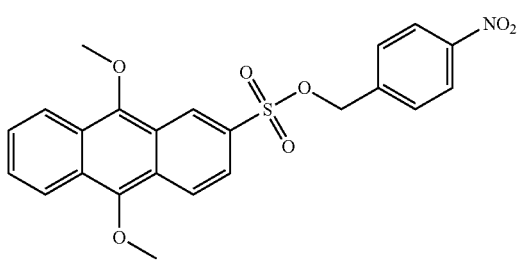 [SMILES: COc1c2ccccc2c(OC)c2cc(S(=O)(=O)OCc3ccc([N+](=O)[O-])cc3)ccc12]

Two photon absorbing compounds, such as PAGs that operate via two photon absorption as defined in Martin, C. J.; Rapenne, G.; Nakashima, T.; Kawai, T. Journal of Photochemistry and Photobiology C: Photochemistry Reviews 2018, 34, 41-51. Examples include:

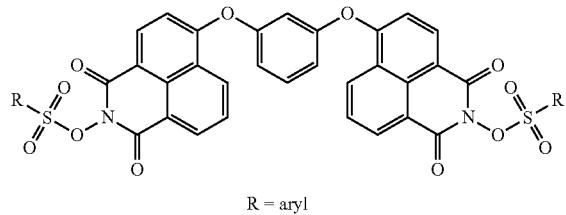

R = aryl

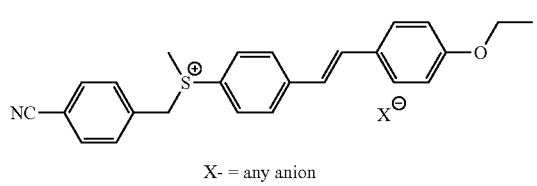

X- = any anion

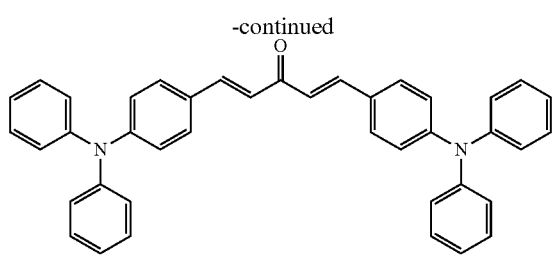

Other PAGs are described in the Examples presented herein below.

In some embodiments, the olefin polymerization mixture comprises about 0.05 mol % to about 200 mol % of the PAG compared to an amount of the precatalyst. In some embodiments, the olefin polymerization mixture comprises about 0.5 mol % to about 1.5 mol % of the PAG compared to an amount of the precatalyst.

In some embodiments, the irradiating is performed with ultraviolet light. In this case, in some embodiments, the first period of time is any desired period of time through which the desired amount of polymerization is accomplished. By way of example and not limitation, the first period of time can range from about 1 second and about 30 minutes. In some embodiments, the first period of time is about 15 minutes.

In some embodiments, the method further comprises contacting an olefin monomer with an olefin polymerization precatalyst, a PAG, and a photosensitizer to provide an olefin polymerization mixture. In this case, the irradiating is performed with visible light or UV light. In some embodiments, the first period of time is any desired period of time through which the desired amount of polymerization is accomplished. By way of example and not limitation, the first period of time can range from about 1 second to about 30 minutes. In some embodiments, the first period of time ranges from about 30 seconds to about 5 minutes. In some embodiment, steps including the photosensitizer are repeated to create subsequent layers of the polyolefin film or 3D object.

In some embodiments, the photosensitizer is selected from the group comprising a benzodioxinone compound, a boron-dipyrromethene dye, a carbazole, a conjugated olefin, a cyanine dye, a diketopyrrolopyrole (DPP), a dithienothiophenes, an isobenzofuran, a ketone, a metal carbonyl compound, a natural dye, a phenothiazine, a conjugated polynuclear aromatic compound, a quinoxaline, and an acridinedione. In some embodiments, the photosensitizer is 5,12-bis(phenylethynyl)tetracene (BPET).

Non-limiting examples of photosensitizers include the following:

Boron-dipyrromethene dyes

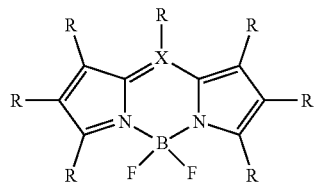

Carbazole derivatives

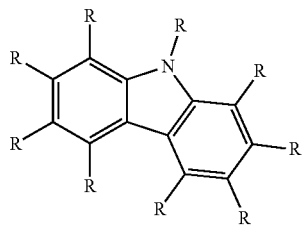

Conjugated olefins

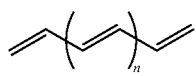

Cyanine dyes—Examples: cyclic azacyanine derivatives

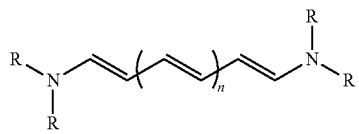

Diketopyrrolopyrole (DPP) derivatives

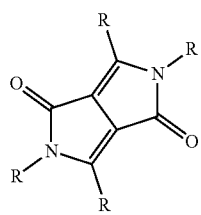

Isobenzofurans

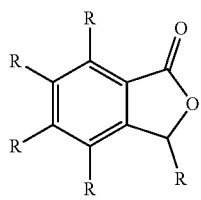

Natural Dyes—Examples: curcuminoids, curcumin and its analogues

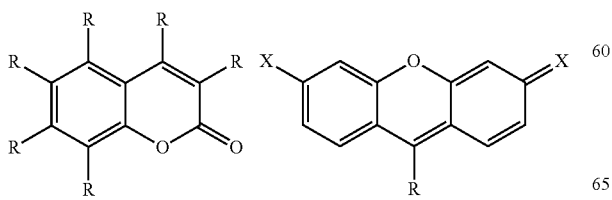

Phenothiazines—Examples: methylene blue

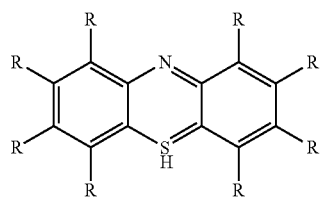

Highly conjugated polynuclear aromatic compounds—Examples: acenes (anthracene, 9,10-diethoxyanthracene, 9,10-di-n-butoxyanthracene, 9-n-butoxyanthracene), rubrene, perylene, pyrene, pyrene derivatives, thioxanthone, benzophenone, acetophenone)

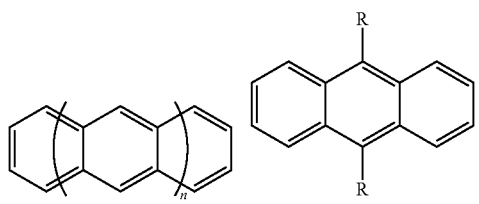

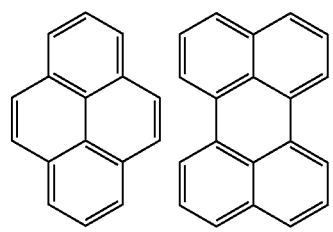

Quinoxaline derivatives

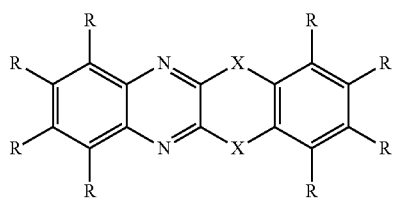

Acrindinedione derivatives

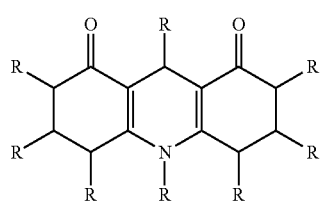

Others

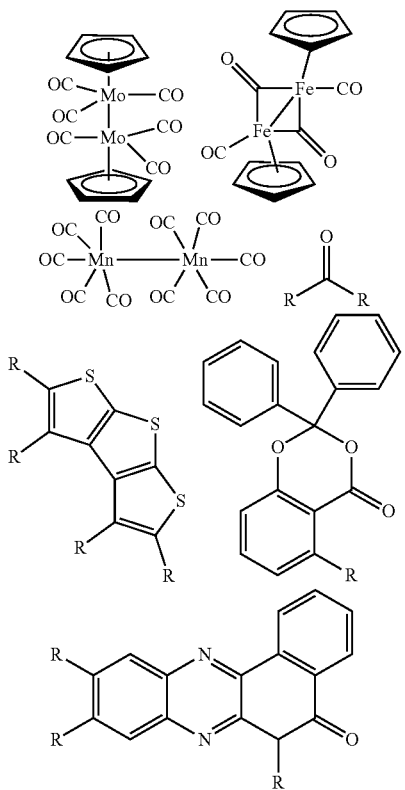

In the above-presented formulas, R=H, alkyl, aryl, heteroaryl, heterocycle, halide, —OR, —N(R)$_2$, —SR, —PR$^2$; X=C, O, N, S, or halide.

In some embodiments, the PAG is contacted with an amount of photosensitizer range from about 0.01 molar equivalents to about 3 molar equivalents of the photosensitizer, in some embodiments an amount ranging from about 0.1 molar equivalents to about 1 molar equivalents of the photosensitizer. In some embodiments, relative to amount of precatalyst loaded, which is defined as 1.0, photosensitizer molar ratio range is about 0.05 to about 1.0 and PAG molar ratio range is about 0.1 to about 3.0. By way of particular example and not limitation, the molar ratio of photosensitizer:PAG:precatalyst is about 0.5:1.0:1.0.

In some embodiments, the olefin monomer is provided as a gas or as a liquid. In some embodiments, contacting an olefin monomer with an olefin polymerization precatalyst and a photoacid generator (PAG) to provide an olefin polymerization mixture comprises: dissolving the PAG and the precatalyst in a solvent, thereby preparing a solution of the PAG and the precatalyst; depositing the solution on a surface of a solid substrate; evaporating the solvent to provide a residue comprising the PAG and the precatalyst; and contacting the residue with the olefin monomer.

In some embodiments, the irradiating provides a polyolefin film on a surface of the solid substrate. In some embodiments, the irradiating provides a layer of a 3D object on a surface of the solid substrate or on a previously provided layer of a 3D object on the surface.

In some embodiments, prior to the irradiating, a portion of the surface of the solid substrate is covered with a photomask, thereby blocking irradiation of a portion of the residue, and wherein the irradiating provides a patterned polyolefin film or a patterned/conformal layer of a 3D object. In some embodiment, step(s) involving the photomask is/are repeated to create patterned polyolefin films or subsequent patterned layers of the 3D object, such as a film or layer disposed on a previously prepared film or layer.

In some embodiments, the solution of the PAG and the precatalyst further comprises a photosensitizer. Here as well, in some embodiments, prior to the irradiating, a portion of the surface of the solid substrate is covered with a photomask, thereby blocking irradiation of a portion of the residue, and wherein the irradiating provides a patterned polyolefin film or a patterned layer of a 3D object. In some embodiment, step(s) involving the selective deposition of the olefin polymerization mixture is used wherein irradiation provides a patterned polyolefin film or a patterned layer of a 3D object. In some embodiment, step(s) involving the photomask is/are repeated to create patterned polyolefin films or subsequent patterned layers of the 3D object, such as a film or layer disposed on a previously prepared film or layer. In some embodiment, step(s) involving the selective deposition of the olefin polymerization mixture is/are repeated to create patterned polyolefin films or subsequent patterned layers of the 3D object, such as a film or layer disposed on a previously prepared film or layer.

In some embodiments, the method further comprises depositing a solution comprising a PAG and a precatalyst on an exposed surface of the polyolefin film or the first layer of the 3D object, evaporating solvent from the solution to provide a dried residue comprising the PAG and the precatalyst; contacting the dried residue with an olefin monomer, wherein said olefin monomer can be a same or different olefin monomer as the olefin monomer used to form the film or first layer; and irradiating the dried residue for a period of time with ultraviolet or visible light, thereby activating the precatalyst to catalyze polymerization of the olefin monomer, thereby preparing a second polyolefin film or second layer, wherein the first polyolefin film and the second polyolefin film, or first layer and second layer of the 3D object together form a multilayered polyolefin structure or 3D object.

In some embodiments of the presently disclosed methods, the polymerization is allowed to continue after irradiation is stopped. In some embodiments, the reaction is then quenched. In solution-phase polymerizations, the polyolefin is precipitated. The period of time the polymerization is allowed to continue is referred to herein as a "second period of time". In the Examples below, methanol and air are used as quenching agents. For embodiments including gas-phase polymerizations, no precipitation is necessary. However, these embodiments can also undergo a first time period of irradiation followed by a second time period in which polymerization continues to grow but without irradiation. In some embodiments, the method further comprises quenching the olefin polymerization mixture after a second period of time by contacting the olefin polymerization mixture with air, alcohol, water, acid, or any organic solvent containing those species. That is, the organic solvent can be any organic solvent that contains dissolved air/oxygen, an alcohol, and/or water.

Representative examples of organic solvents include dichlorormethane, toluene, methanol, ethanol, hexanes, heptane, or any other aliphatic or aromatic hydrocarbon. In some embodiments, the second period of time ranges from about 1 second to about 6 hours, including about 5 minutes and about 30 minutes.

In some embodiments, the polyolefin film or 3D object is separated or collected from the solid substrate. in some embodiments, the separating and/or collecting comprises precipitating the polyolefin via the addition of air, alcohol, water, acid, or any organic solvent containing those species to the olefin polymerization mixture.

In some embodiments, the presently disclosed subject matter provides a multilayered polyolefin structure or a multilayered polyolefin 3D object. In some embodiments, the structure or object is prepared by an additive manufacturing technique, which in some embodiments is exemplified by the methods and compositions of the presently disclosed subject matter. In some embodiments, the multilayered polyolefin structure or a multilayered polyolefin 3D object comprises a first polyolefin layer and one or more additional polyolefin layers disposed on the first layer. In accordance with the additive manufacturing techniques, the one or more additional layers can be sequentially disposed on each other. In embodiments, the one or more additional layers are conformal layers, patterned layers, or combinations thereof. In some embodiments, the one or more additional layers can comprise the same or different polyolefin as the first layer. In some embodiments, in a multilayered polyolefin structure or a multilayered polyolefin 3D object, one or more layers can comprise a material other than a polyolefin.

In some embodiments, the presently disclosed subject matter provides an ink composition for use in an additive manufacturing process, such as a 3D printing process. In some embodiments, the ink composition comprises a precatalyst and a PAG as disclosed herein. In some embodiments the ink composition can further comprise a photosensitizer and/or monomer as disclosed herein. Thus, in some embodiments, the monomer can be contacted with an ink composition separately when the monomer is a gas. In some embodiments, the monomer (e.g., $C_3$ and larger alpha olefins) are liquids that can be included in the ink composition or introduced separately.

In some embodiments, the ink composition comprises about 0.05 mol % to about 200 mol % of the PAG compared to an amount of the precatalyst. In some embodiments, the ink composition comprises about 0.5 mol % to about 1.5 mol % of the PAG compared to an amount of the precatalyst.

In some embodiments, the PAG is contacted with an amount of photosensitizer range from about 0.01 molar equivalents to about 3 molar equivalents of the photosensitizer, in some embodiments an amount ranging from about 0.1 molar equivalents to about 1 molar equivalents of the photosensitizer. By way of particular example and not limitation, the ratio of photosensitizer:PAG:precatalyst is about 0.5:1.0:1.0.

EXAMPLES

The following Examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

UV Activated Polymerization of 1-Hexene

Figure 2:
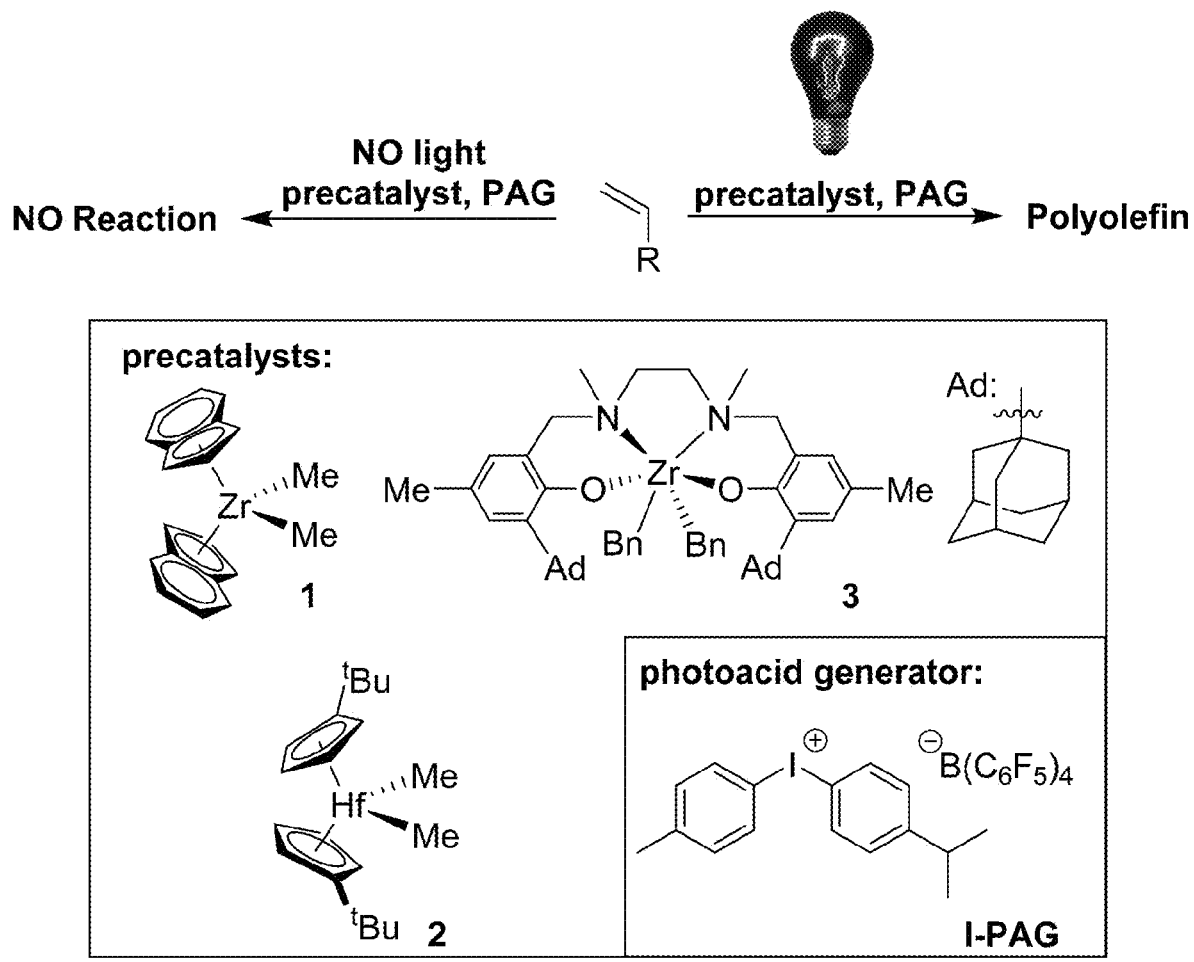
FIG. 2 is a schematic showing polymerization of olefinic monomers using precatalysts 1-3 activated by an iodonium PAG (I-PAG) in the presence of UV light.

In this Example, replacing traditionally used Brønsted acids with a PAG to provide light-stimulated precatalyst activation was tested with respect to alkyl substituted olefin polymerization. Particularly, in this Example, polymerization of 1-hexene using common metallocene olefin polymerization precatalysts, dimethylbis(indenyl) zirconium (1), dimethylbis(tert-butylcyclopentadienyl) halfnium (2), and a non-metallocene ONNO-type catalyst (3) in combination with the iodonium PAG, 4-isopropyl-4'-methyldiphenyliodonium tetrakis(pentafluorophenyl) borate (I-PAG) was carried out as an initial test platform (FIG. 2). This PAG was chosen due to its commercial availability and weakly coordinating borate anion, which is known to prevent tight ion pair association between the active, cationic olefin polymerization catalyst and the corresponding counter anion following activation (Chen et al., Chem. Rev. 2000, 100). The light source employed was a handheld 4 W compact UV lamp (254 nm).

To establish optimal polymerization conditions for all precatalysts, 1-hexene was polymerized using precatalyst 1 with varying amounts of I-PAG activator and UV light exposure. This first study altered the equivalents of I-PAG (0.5-1.5 equiv.) while holding exposure time at a prolonged 30 minutes (Table 1, entries 1-3). Modulating the equivalents of I-PAG lead to 38-60% monomer conversion, consistent molecular weights ($M_w$=17.0-25.3 kg/mol), and broad polydispersity (Đ=1.57-2.23). Comparing the conversion decrease from entry 2 to entry 3 and while it is not desired to be bound by any particular theory of operation, it is hypothesized that adding excess I-PAG can generate excess protons and promote higher rates of chain-transfer and catalyst deactivation. The results of this study support the use of a catalyst-activator ratio of 1:1 for desirable conversion.

TABLE 1

Polymerization of 1-hexene using precatalyst 1 varying activator equivalents and UV exposure time.[a]

| entry | activator | equivalents of activator | exposure time (min)[b] | % conv. | Mw[c] (kg/mol) | Đ[c] |
|---|---|---|---|---|---|---|
| 1 | I-PAG | 0.5 | 30 | 38 ± 1.3 | 17.2 | 1.76 |
| 2 | I-PAG | 1.0 | 30 | 60 ± 1.6 | 25.0 | 2.23 |
| 3 | I-PAG | 1.5 | 30 | 50 ± 1.9 | 25.3 | 1.57 |
| 4 | I-PAG | 1.0 | 1 | 6 ± 1.7 | 18.6 | 1.53 |
| 5 | I-PAG | 1.0 | 5 | 48 ± 3.8 | 25.4 | 1.63 |
| 6 | I-PAG | 1.0 | 15 | 64 ± 2.3 | 19.7 | 2.60 |
| 7 | I-PAG | 1.0 | 30 | 60 ± 1.6 | 25.3 | 1.57 |
| 8 | AB | 1.0 | 0 | 61 ± 1.7 | 25.3 | 1.82 |
| 9[d] | I-PAG | 1.0 | 15 | 0 | — | — |
| 10 | I-PAG | 1.0 | 0 | 0 | — | — |

[a]Polymerization conditions: Polymerization time = 3 h, precatalyst 1 = 10.0 µmol, 3 mL of 1-hexene, and 1 mL of DCM at 20° C. [b]Irradiated using a handheld 4 W compact UV lamp operating at 254 nm. [c]Determined using triple detection GPC at 150° C. in 1,2,4-trichlorobenzene. [d]No precatalyst was added.

Following the equivalents study, the UV exposure time (1-30 minutes) was changed to further understand how this variable impacts my polymerizations (Table 1, entries 4-7). Increasing the light exposure time leads to a range of monomer conversion between 6-64%, consistent polymer molecular weights ($M_w$=18.6-25.4 kg/mol), and broad polymer dispersity (Đ=1.53-2.60). At short exposure time, a small concentration of precatalyst is activated, leading to low monomer conversion. As exposure time increases, monomer conversion increases until a maximum precatalyst activation was reached at 15 minutes of UV light. To conserve the quality of the light source, future polymerization using I-PAG includes 15 minutes of UV light exposure.

Figure 4:
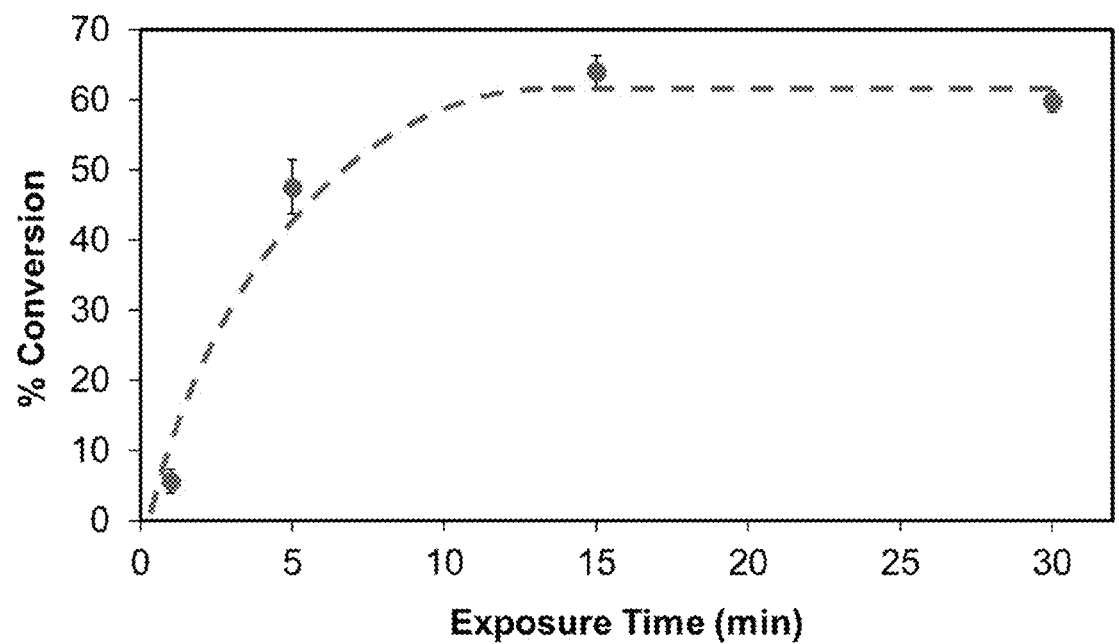
FIG. 4 is a graph showing polymerization of 1-hexene using precatalyst 1 and I-PAG varying UV exposure time.

In assessing the conditions for light-activated olefin polymerizations, several control experiments were conducted to compare and support this unique activation method. First, pre-catalyst 1 was activated by using the traditional Brønsted acid activator, N,N-dimethylanilinium tetra(pentafluoro-phenyl)borate (AB), in replace of I-PAG (Table 1, entry 8). AB activates olefin polymerization precatalysts via protonolysis of bound alkyl substituents, and for the polymerization of 1-hexene was found to reach 61% monomer conversion. The polymer produced using AB as the activator is comparable in molecular weight ($M_w$=25.3 kg/mol) and polydispersity (Đ=1.82) to polymerizations using I-PAG (Table 1, entry 8). On the other hand, productivity of precatalyst 1 in combination with I-PAG/UV yielded slightly better conversions at 64% when equivalents and UV exposure are optimized (FIG. 4). The next two control polymerizations were conducted to ensure that UV irradiation of the system and incorporation of I-PAG had no additional effect on the results (Table 1, entries 9-10). First, I-PAG was irradiated under identical polymerization conditions except that no olefin precatalyst was present. As expected, no poly(1-hexene) was produced (Table 1, entry 9). Second, to demonstrate that I-PAG cannot activate the precatalyst without UV light exposure, precatalyst 1 was selected as an example and it was combined with I-PAG under identical polymerization conditions and shielded from any light exposure. Again, no polymer was formed (Table 1, entry 10). These control reactions, in conjunction with the successful polymerization results (Table 1, entries 1-8), allow for the conclusion that a) precatalyst, I-PAG, and UV irradiation can be used for polymerization activity, and that b) I-PAG is indeed a competent olefin polymerization photoactivator that yields comparable results to polymerizations activated using traditional chemical reagents.

Figure 3:
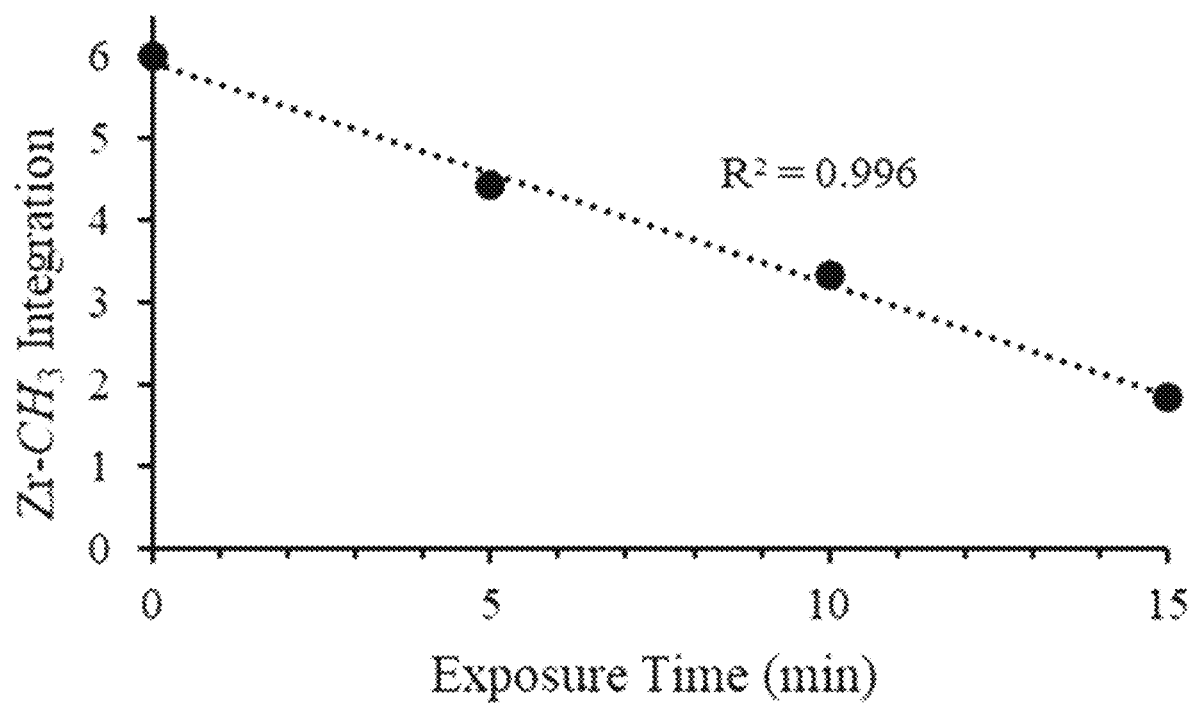
FIG. 3 is a graph showing monitoring the Zr—$CH_3$ peak integration of precatalyst 1 as a function of UV exposure time using $^1$H NMR spectroscopy.

To further probe the activation process and test the hypothesis that protons resulting from UV irradiation of I-PAG result in precatalyst activation via protonolysis of the metal-alkyl substituents, nuclear magnetic resonance (NMR) was used to monitor the protonolysis of Zr bound methyl groups present in precatalyst 1 (FIG. 3), which is known to occur during activation with Brønsted acidic activators such as N,N-dimethylanilinium tetra(pentafluorophenyl) borate (Phillips, et al., *J Appl Polym Sci* 2019, 136 (9), 47141). It was possible to track the Zr—CH$_3$ signal integration as it decreased linearly as a function of UV exposure time. While it is not desired to be bound by any particular theory of operation, this decrease was attributed to more and more protons being released into solution as I-PAG is irradiated and the Zr—CH$_3$ bonds are cleaved via protonolysis, thereby releasing methane and generating the olefin polymerization active cationic Zr center.

After optimization and mechanistic confirmation of the PAG activation method using precatalyst 1, the precatalyst catalog applicable for this activation method was expanded to test an alternative metallocene bearing a different active metal center (2). (Table 2, entries 1 & 3). Holding activator concentration at optimal conditions determined in Table 1, precatalyst 2 reached 17% monomer conversion, molecular weight of 4.1 kg/mol, and a polydispersity of 2.77 upon activation with AB (Table 2, entry 1). When using I-PAG as the activator, precatalysts 2 polymerized 1-hexene to 43% monomer conversion, molecular weight of 1.6 kg/mol, and a polydispersity 2.73 to their AB activated polymerizations (Table 2, entry 3). It is noted that when comparing the activation performance of AB and I-PAG with precatalyst 1 and 2, the polymerizations using I-PAG reached higher monomer conversions. Without being bound by any particular theory of operation, it is hypothesized that this observation is due to the improved acidic nature of the protonic acid produced from the photodecomposition of the iodonium salt than the protonated amine, leading to more active catalytic species, ultimately improving polymer yield.

TABLE 2

Polymerization of 1-hexene using precatalysts 2 & 3 activated by AB or I-PAG[a]

| entry | Precatalyst | activator | exposure time (min)[b] | % conv. | Mw[c] (kg/mol) | Đ[c] |
|---|---|---|---|---|---|---|
| 1 | 2 | AB | 0 | 17 ± 0.1 | 4.1 | 2.77 |
| 2 | 3 | AB | 0 | 41 ± 0.9 | 47.9 | 2.12 |
| 3 | 2 | I-PAG | 15 | 43 ± 3.1 | 1.6 | 2.73 |
| 4 | 3 | I-PAG | 5 | 28 ± 2.0 | 46.1 | 2.09 |

[a]Polymerization conditions: Polymerization time = 3 h, precatalyst = 10.0 µmol, activator = 10.0 µmol, 3 mL of 1-hexene, and 1 mL of DCM at 20° C.
[b]Irradiated using a handheld 4 W compact UV lamp operating at 254 nm.
[c]Determined using triple detection GPC at 150° C. in 1,2,4-trichlorobenzene.

To further expand the precatalyst library of this photoinduced activation method to alternative ligand scaffolds, a non-metallocene ONNO-type precatalyst (3) was selected, which is commonly activated via protonolysis for olefin polymerizations as reported by Kol and Busico (Kavarnos, G. J.; Turro, N. J., *Chem. Rev.* 1986, 86 (2), 401-449; Turley, W. D.; Offen, H. W., *The Journal of Physical Chemistry* 1984, 88 (16), 3605-3607; *Radiation Curing in Polymer Science and Technology*. 1 ed.; Springer Netherlands: 1993; Vol. 3, p 563; Desert, X.; Carpentier, J.-F.; Kirillov, E., *Coord. Chem. Rev.* 2019, 386, 50-68). Following optimal polymerization conditions previously established, precatalyst 3 lead to 41% monomer conversion, poly(1-hexene) molecular weight of 47.9 kg/mol, and polydispersity of 2.12 when activated using AB (Table 2, entry 2). When using I-PAG as the activator the UV exposure time was adjusted because initially irradiating precatalyst 3 for 15 minutes lead to low monomer conversion (10%). Following this result, several additional polymerizations were conducted, altering UV exposure time to determine an optimal irradiation time of 5 minutes. While it is not desired to be bound by any particular theory of operation, it is hypothesized that that exposure times longer than 5 minutes lead to photoinduced catalyst deactivation/decomposition due to metallocene catalysts ability to absorb UV light, while exposure times shorter than 5 minutes limit the production of protons required to effectively activate precatalyst 3. When using the optimal exposure time of 5 minutes, precatalyst 3 reached 28% monomer conversion, poly(1-hexene) molecular weight of 46.1 kg/mol, and polydispersity of 2.09 when activated using I-PAG (Table 2, entry 4). Future polymerizations of other olefins using precatalyst 3 will include a 5-minute exposure time for optimal results.

Example 2

UV Activated Polymerization of Ethylene

Having successfully demonstrated the ability to activate a variety of olefin polymerization precatalysts for the polymerization of 1-hexene, this methodology was evaluated using the more industrially-relevant gaseous feedstock, ethylene. Therein, ethylene polymerizations were conducted using precatalysts 1-3 using the optimized conditions established above, as well as corresponding control experiments (Table 3). First, a baseline of polymerization activity for precatalysts 1-3 was established using the chemical activator AB (Table 3, entries 1-3), which produced between 46-120 mg of polyethylene depending upon the precatalyst used. The resultant polymer produced contained a broad range of molecular weights ($M_w$=44.3-228.3 kg/mol) and broad polydispersity (Đ=2.77-4.83). Additional control experiments were also performed in which I-PAG was introduced to the polymerization reactor, but without any UV irradiation to ensure that no unwanted "dark" polymerizations occurs (Table 3, entries 4-6). As expected, no polyethylene was produced, once again confirming that both UV irradiation and I-PAG can be used to generate the active catalyst form. Light activated ethylene polymerizations were conducted by irradiating reactions containing precatalysts 1-3 and I-PAG for 5 or 15 min (Table 3, Entries 7-9). As expected, polyethylene was produced in comparable yields (17.9-335 mg) to those produced using the traditional chemical activator AB. The polyethylene produced displayed comparable properties such as, molecular weight ($M_w$=25.6-183.5 kg/mol) and polymer dispersity (Đ=2.23-3.54) when compared to the polymers produced using AB as an activator.

TABLE 3

Polymerization of ethylene using precatalysts 1-3 activated by I-PAG and UV exposure.[a]

| entry | precatalyst | activator | exposure time (min)[b] | yield (mg) | $M_w$[c] (kg/mol) | Đ[c] |
|---|---|---|---|---|---|---|
| 1 | 1 | AB | 0 | 120 ± 12.1 | 228.3 | 4.83 |
| 2 | 2 | AB | 0 | 87 ± 14.3 | 89.1 | 2.77 |
| 3 | 3 | AB | 0 | 46 ± 8.5 | 44.3 | 3.03 |
| 4 | 1 | I-PAG | 0 | 0 | — | — |
| 5 | 2 | I-PAG | 0 | 0 | — | — |
| 6 | 3 | I-PAG | 0 | 0 | — | — |
| 7 | 1 | I-PAG | 15 | 335 ± 11.4 | 183.5 | 3.54 |
| 8 | 2 | I-PAG | 15 | 189 ± 10.2 | 74.7 | 2.23 |
| 9 | 3 | I-PAG | 5 | 17.9 ± 7.7 | 25.6 | 2.48 |

[a]Polymerization conditions: precatalyst = 10.0 μmol, activator = 10.0 μmol, ethylene = 15 psi, 1 mL of DCM, 19 mL of toluene, 20° C., and polymerization time = 30 min.
[b]Irradiated using a handheld 4 W compact UV lamp operating at 254 nm.
[c]Determined using triple detection GPC at 150° C. in 1,2,4-trichlorobenzene.
[d]Precatalyst and monomer were not exposed to UV light.

Example 3

Gas-Phase, 3D Printing of Polyolefins Using UV Light-activated Olefin Polymerizations The ability to 3D print polyolefins in the gas-phase, in a similar fashion to SLA and DLP printing, via light-activated olefin polymerization, was then tested. Having demonstrated that UV light can indeed be used as an external stimuli to provide temporal control over the activation of olefin polymerization precatalysts, efforts were turned to: 1) ascertaining if polyolefin films could be grown from a gas-phase monomer feed, and 2) ascertaining if polyolefin film growth could be spatially regulated via controlled UV light exposure (exposed vs. unexposed areas).

TABLE 4

Polymer film properties following gas-phase polymerizations with precatalysts 1-3 and I-PAG/UV light[a]

| Entry | Precatalyst | $M_w$[b] (g/mol) | Đ[b] |
|---|---|---|---|
| 1 | 1 | 3.8 × 10$^6$ | 2.01 |
| 2 | 2 | 656.4 × 10$^3$ | 5.42 |
| 3[c] | 3 | N/A | N/A |

[a]Polymerization conditions: precatalyst = 50.0 μmol, I-PAG = 50.0 μmol, ethylene = 30 psi, 20° C., irradiated using a handheld 4 W compact UV lamp operating at 254 nm for 15 min., and polymerization time = 30 min.
[b]Determined using triple detection GPC at 150° C. in 1,2,4-trichlorobenzene.
[c]Precatalyst prepped substrate was irradiated for 5 min.

Figure 5A:
FIGS. 5A-5C are photographs showing the production of conformal polyethylene films using precatalyst 2 and light-activated olefin polymerization. The pictures shown are of a U.S. quarter after deposition and evaporation of the precatalyst 2/I-PAG solution (FIG. 5A); after UV exposure (FIG. 5B); and after the film is lifted from the support via submerging in methanol (FIG. 5C).
Figure 5B:
Figure 5C:
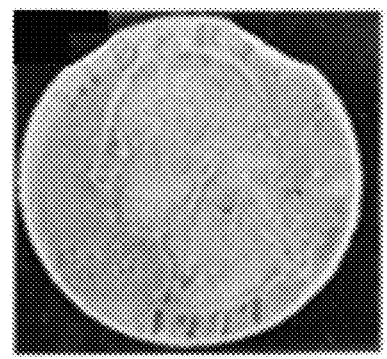

To determine if polyolefin films could be grown by a gas-phase, light-activated olefin polymerization process, ethylene was used as a monomer of choice. Therein, a solution of desired precatalyst (1-3) and I-PAG were prepared in DCM and shielded from ambient light. The precatalyst/I-PAG solution was then deposited onto a support substrate via either drop-casting or spray coating. The casting solvent quickly evaporated leaving a precatalyst-activator residue on the substrate surface, which was loaded into a quartz pressure reactor. The polymerization reactor was pressurized with ethylene gas (30 psi) and exposed to UV irradiation using the same handheld 4 W compact UV lamp (254 nm) as used for the previous solution state polymerizations above. When conducting gas-phase polymerizations, the precatalyst and activator concentration was increased 3-5 times compared to solution-phase polymerizations in order to produce enough polymer to use for GPC characterization. Table 4 contains the properties of the polyethylene films produced by precatalysts 1-3. Precatalyst 1 and 2 produce high molecular weight polyethylene films ($M_w$=0.7-3.8×10$^6$ g/mol) with broad polydispersity (Đ=2.01-5.42) and routine film thickness of 15-30 μm. It is noted that the molecular weight data collected is outside the range of detection for the GPC instrument, so the results are not accurate, but confirm that these films comprise high molecular weight polyethylene via light-activated gas-phase polymerizations. It is not uncommon for gas-phase polymerizations to reach higher molecular weights compared to solution-phase due to the absence of a polymerization solvent that causes polymer to crash out, increasing the viscosity of the solution, ultimately limiting obtainable molecular weights (Vatamanu et al., *Macromolecules* 2005, 38 (24), 9944-9949; Crivello et al., *Journal of Polymer Science: Polymer Chemistry Edition* 1979, 17 (4), 1059-1065. On the other hand, precatalyst 3 was unable to produce a polyethylene film. While it is not desired to be bound by any particular theory of operation, it is hypothesized that this is due to the UV light instigating photoinduced deactivation/decomposition. Following the confirmation of polyethylene thin films on flat substrates, the ability to grow conformal films over topology was demonstrated, such as is pictured in FIG. 5A-5C in which conformal polyethylene films were grown from the surface of a U.S. quarter. These films were lifted from the support substrate by submersing in non-solvent (methanol) to yield free-standing films that retained the topology and fine detail of their substrate.

Figure 6:
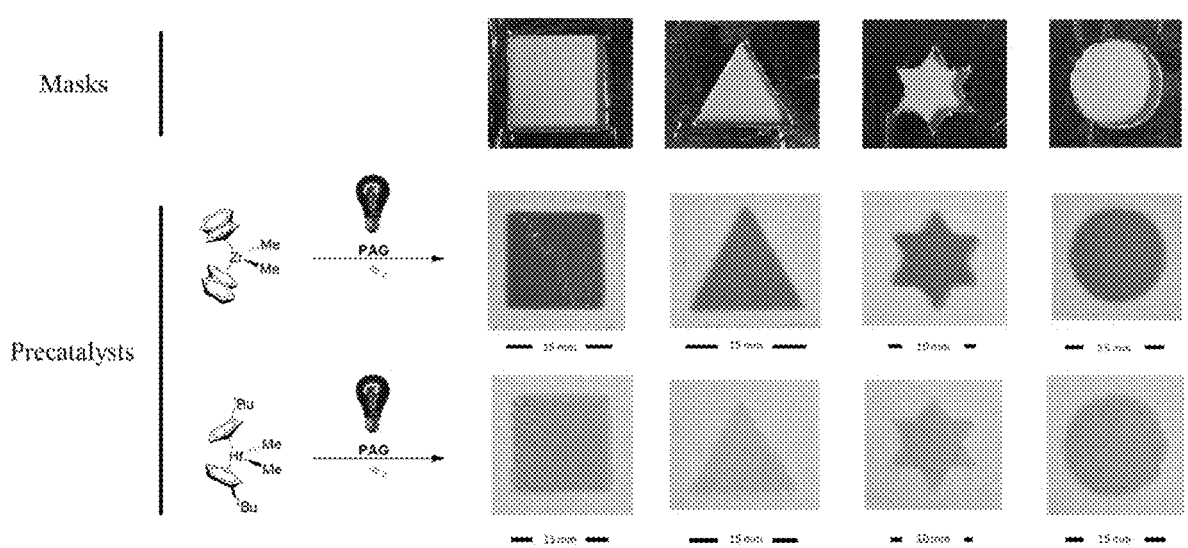
FIG. 6 is a set of photographs of the photomasks used (top images) and the resultant spatially controlled, patterned polyolefin films (bottom images). Note: the orange color results when precatalysts 1 and 2 are activated using I-PAG and UV exposure.

After demonstrating the ability of polyolefin thin films to mimic surface topology, it was then determined if polyolefin film formation could be spatially controlled using light-activated olefin polymerization. Like temporal control, spatial control is also a fundamental aspect of SLA and DLP 3D printing processes. It allows polymer to only be printed in those areas exposed to light, whereas no polymer is produced in unexposed regions. For these experiments, the precatalysts 1/I-PAG and 2/I-PAG solution was deposited onto a glass slide and dried. A photomask, which allows a defined portion of the substrate to be irradiated while all other areas remain unexposed, was placed on top of the coated slide and then flooded with UV light. As can be seen in FIG. 6, the positive-tone images are transferred to the substrate only in the regions not covered by the photomask. The exposed regions turn from colorless to orange or red as the irradiated I-PAG activates precatalysts 1 and 2 and begins olefin polymerization. Submerging these films in a nonsolvent (methanol) decomposes the remaining catalyst and the colorless, patterned polyethylene films can then be lifted from the substrate.

In addition to establishing fundamental proof that light-activated olefin polymerization can provide both temporal and spatial control for 3D printing applications, it was also explored if this methodology could be used to generate multi-layer structures. Since precatalyst 1 has demonstrated superior polymerization activity, it was used it for this study in order to obtain films with a maximum desired thickness. To determine if multi-layer structures could be produced, a polyethylene film was grown from a glass substrate as described above. After production of the first layer, a subsequent precatalyst 1/I-PAG layer was deposited and a second polymer layer is grown upon exposure to UV light and ethylene gas. These films were measured using a micrometer, and in a specific example, the layer thicknesses were found to be 20 and 18 µm for the first and second layers, respectively (38 µm total thickness of both layers). With the results presented, it has been demonstrated that a PAG with light can be used to implement temporal and spatial control over the activation of alkyl substituted precatalysts for olefin polymerizations creating thin polyethylene films. This type of control supports 3D printing the world's cheapest plastic.

Example 4

Visible Light Activated Polymerization of 1-Hexene

While synthesizing polyethylene thin films using an iodonium salt and UV light to activate olefin polymerization precatalysts, several issues were identified. First, the exposure time required to reach maximum precatalyst activation was 15 minutes, which is a relatively lengthy period of time. In order for this photochemical activation method to become a practical tool to achieve 3D printed polyolefin materials, exposure times need to be vastly improved. Second, the UV light source, used to generate the activating species, interfered with the ONNO-type catalyst activity and longevity. A plethora of metallocene and non-metallocene precatalysts absorb UV light, so observations that this wavelength can be detrimental to catalyst lifetime might reduce the applicable precatalyst library. Lastly, the fragile quartz pressure vessels required low-pressure gas-phase polymerizations, ultimately leading to thin, delicate patterned and conformal olefin films that were difficult to handle and isolate. An attractive quality in 3D printing is the capability to produce large-scale robust materials, which could be difficult using low-pressured polymerizations.

Heterocyclic compounds, polycyclic hydrocarbons, and organic dyes are common photosensitizers used to induce photolysis of onium salts (Shi et al., *Photoinitiating systems for cationic photopolymerization: Ongoing push toward long wavelengths and low light intensities.* 2016; Vol. 65; Toba, Y.; Saito, M.; Usui, Y., *Macromolecules* 1999, 32 (10), 3209-3215; Crivello, J. V.; Jang, M., *Journal of Photochemistry and Photobiology A: Chemistry* 2003, 159 (2), 173-188; Schnabel, W., *Macromol Rapid Comm* 2000, 21 (10), 628-642; Crivello, J. V.; Jiang, F., *Chemistry of Materials* 2002, 14 (11), 4858-4866). These photosensitive molecules absorb light, creating an excited species, that undergoes a photoinduced electron transfer (PET) to reduce the onium salt, generating an unstable cationic radical complex that can further react and produce protonic acid (Phillips et al., *J Appl Polym Sci* 2019, 136 (9), 47141). When selecting the photosensitizer-PAG pair, it is desirable that the energetics are thermodynamically feasible (Shi et al., *Photoinitiating systems for cationic photopolymerization: Ongoing push toward long wavelengths and low light intensities.* 2016; Vol. 65; Dadashi-Silab, S.; Doran, S.; Yagci, Y., *Chem. Rev.* 2016, 116 (17), 10212-10275; Kavarnos, G. J.; Turro, N. J., *Chem. Rev.* 1986, 86 (2), 401-449; Turley, W. D.; Offen, H. W., *The Journal of Physical Chemistry* 1984, 88 (16), 3605-3607). As an electron is excited to the LUMO of the photosensitizer, it must be able to relax to the LUMO of the PAG in order to generate the reactive cationic radical species. Kohl and coworkers recently studied several polynuclear aromatic hydrocarbons and their photosensitization compatibility with I-PAG (Phillips et al., *J Appl Polym Sci* 2019, 136 (9), 47141).

Figure 7:
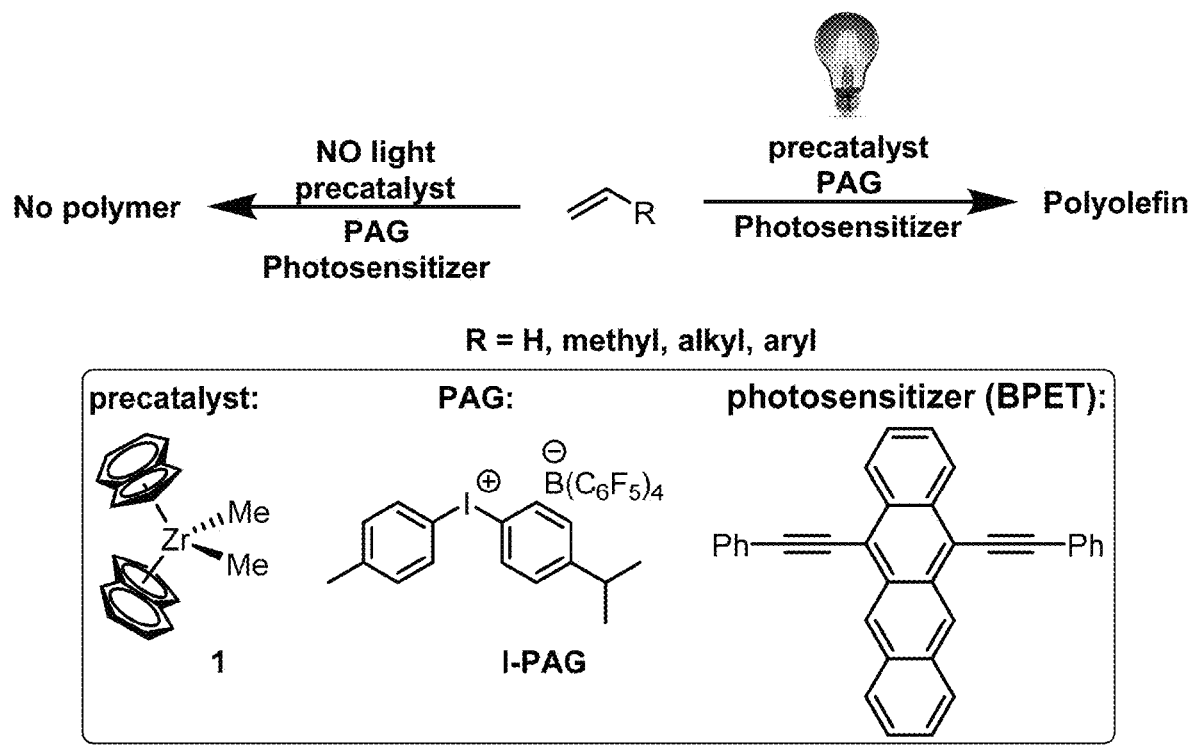
FIG. 7 is a schematic showing polymerization of olefinic monomers by precatalyst 1 using a photosensitizer (BPET) with a PAG (I-PAG) and visible light to induce photochemical activation.

From this study, 5,12-bis(phenylethynyl)tetracene (BPET) was selected as the photosensitizer for this exemplary photoinduced system because its high molar extinction coefficient in the visible region, lack of heteroatoms, and favorable thermodynamics of the PET in comparison to other photosensitizers studied. Incorporation of this photosensitizer with I-PAG allows use a visible light source to photoinduce precatalyst activation for olefin polymerizations (FIG. 7). The light source selected for the following polymerizations is a 3 W green LED.

Incorporating BPET with precatalyst and PAG adds another variable that will require testing to better understand its role in the polymerization. Based on the Examples set forth herein above, the ratio of I-PAG:precatalyst is held constant at 1:1. The first experiment conducted with this selected photosensitizer includes varying equivalents (0.01-1.0 equiv.), while holding exposure time at a prolonged 30 minutes for the polymerization of 1-hexene (Table 5, entries 1-4). Altering the equivalents of BPET led to 70-93% monomer conversion, consistent molecular weights ($M_w$=19.4-26.2 kg/mol), and broad polydispersity (Đ=1.54-2.65). Introducing a photosensitizer into the polymerization improved the monomer conversion by >30%. In addition, polymer production was optimal using sub stoichiometric amounts of BPET. Even a photosensitizer equivalent of 0.1 lead to the conversion of 10% more monomer then compared to polymerizations using I-PAG and UV light. The addition of BPET red-shifts the wavelength required to instigate proton release compared to onium salts absorbing broad band UV light. This absorbance at longer wavelengths captures a higher fraction of the emitted light, ultimately leading to a higher concentration of initiating species present to activate more precatalyst and polymerize more monomer (Crivello, J. V.; Jang, M., *Journal of Photochemistry and Photobiology A: Chemistry* 2003, 159 (2), 173-188). This equivalents study has determined a representative ratio of photosensitizer:PAG:precatalyst for future polymerizations to be 0.5:1.0:1.0.

Figure 8:
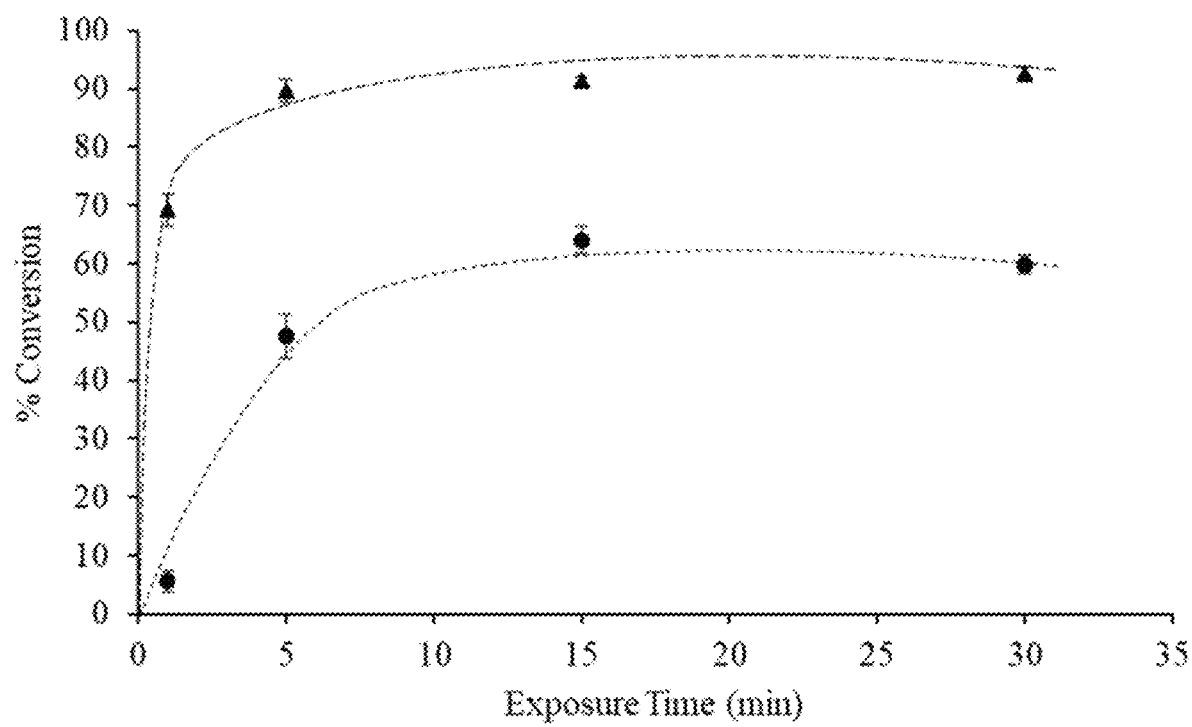
FIG. 8 is a plot of monomer conversion as a function of exposure time using precatalyst 1 and I-PAG/UV (●) or BPET+I-PAG/LED (▲) photoinduced activation methods for 1-hexene polymerizations.

As previously discussed, using I-PAG and UV light to activate olefin precatalysts involved an exposure time of 15 minutes. Since the photosensitization of onium salts is an efficient electron transfer process, it was hypothesized that the irradiation time required to reach maximum active catalyst concentration will occur in a reduced time period. To test this hypothesis, several polymerizations were conducted, varying exposure time (1-30 minutes) while holding all other variables constant (Table 5, entries 5-8). Increasing the light exposure time leads to efficient monomer conversion between 69-93%, consistent poly(1-hexene) molecular weight ($M_w$=19.4-26.5 kg/mol), and broad polymer dispersity (Đ=1.31-2.63). FIG. 8 compares the drastic change in catalyst activity with the addition of a photosensitizer versus the original PAG system. Higher monomer conversions were achieved using 1 minute of green LED light versus 15 minutes of UV light in the previous study, confirming the hypothesis that photosensitized of onium salts leads to an efficient production of protonic acid. Since sufficient monomer conversion was reached after only 5 minutes of LED irradiation, future polymerizations using BPET can use 5 minutes of green light exposure.

To further confirm that the photosensitizer is responsible for these active polymerizations, several control experiments were conducted to compare and support this unique activation method. Precatalyst 1 activated using the traditional Brønsted acid activator, N,N-dimethylanilinium tetra(pentafluoro-phenyl)borate (AB), in replacement of a photoacid generator was found to reach 61% monomer conversion (Table 5, entry 8). The polymer produced was comparable in molecular weight ($M_w$=25.3) and polydispersity (Đ=1.82) to polymerizations using BPET+I-PAG. It is noted that incorporating equivalents of BPET as low as 0.1 and limiting the exposure time to 1 minute produced more poly(1-hexene) than traditional activation methods (AB). The next two control polymerizations were conducted to ensure that production of a Brønsted acid in the absence of precatalyst (Table 5, entry 9), and BPET's excited state in the absence of I-PAG (Table 5, entry 10) could not lead to the polymerization of 1-hexene. The following control polymerizations confirm that I-PAG cannot produce acid in the presence of green light, and that BPET and I-PAG cannot undergo PET without green light (Table 5, entries 10-11). These control reactions, in conjunction with the successful polymerization results, allow the conclusion that a) precatalyst, I-PAG, BPET, and a green light source are each required for polymerization activity, and b) that the photosensitization of I-PAG is indeed a superior photoactivation method for precatalyst 1 yielding higher monomer conversion versus I-PAG/UV light and traditional chemical reagents activators.

TABLE 5

Polymerization of 1-hexene using precatalyst 1 varying photosensitizer equivalents and LED exposure time.[a]

| entry | Photo-sensitizer | equivalents of photo-sensitizer | exposure time (min)[b] | % conversion | Mw[c] (kg/mol) | Đ[c] |
|---|---|---|---|---|---|---|
| 1 | BPET | 0.01 | 30 | trace | — | — |
| 2 | BPET | 0.1 | 30 | 70 ± 3.8 | 26.2 | 2.65 |
| 3 | BPET | 0.5 | 30 | 93 ± 1.1 | 19.4 | 1.85 |
| 4 | BPET | 1.0 | 30 | 90 ± 0.9 | 24.7 | 1.54 |
| 5 | BPET | 0.5 | 1 | 69 ± 2.8 | 26.4 | 2.63 |
| 6 | BPET | 0.5 | 5 | 90 ± 1.9 | 26.5 | 1.51 |
| 7 | BPET | 0.5 | 15 | 91 ± 0.8 | 25.4 | 1.31 |
| 8 | BPET | 0.5 | 30 | 93 ± 1.1 | 19.4 | 1.85 |
| 8[d] | None | n/a | 0 | 61 ± 1.7 | 25.3 | 1.82 |
| 9[e] | BPET | 0.5 | 5 | 0 | — | — |
| 10[f] | BPET | 0.5 | 5 | 0 | — | — |
| 11[g] | None | n/a | 5 | 0 | — | — |
| 12 | BPET | 0.5 | 0 | 0 | — | — |

[a]Polymerization conditions: Polymerization time = 3 h, precatalyst 1 = 10.0 μmol, activator I-PAG = 10.0 μmol, 3 mL of 1-hexene, and 1 mL of DCM at 20° C.
[b]Irradiated using a handheld 3 W green LED operating at 565 nm.
[c]Determined using triple detection GPC at 150° C. in 1,2,4-trichlorobenzene.
[d]Activator N,N-dimethylanilinium tetra(pentafluorophenyl)borate = 10.0 μmol.
[e]No precatalyst was added.
[f]No I-PAG was added.
[g]No BPET was added.

After manipulating the conditions of this elegant photoactivation method as they pertain to a zirconium metallocene, the utility of this activation process was confirmed with other precatalyst designs. Precatalyst 2 remains in the metallocene family, but with an alternative metal-center, hafnium. Polymerizing 1-hexene with precatalyst 2 after photoinduced activation lead to 54% monomer conversion, low molecular weight ($M_w$=5.0 kg/mol), and broad polydispersity (Đ=2.80) (Table 6, entry 3). This activation method yields comparable polymer characteristics to traditional activation methods, while improving the monomer conversion by 37% (Table 6, entry 1). Expanding outside of the metallocene genre, ONNO-type metallocene's are common precatalysts well studied and activated by Brønsted acids. Testing the success of this effective activation method to precatalyst 3 resulted in 51% monomer conversion, moderate molecular weight ($M_w$=47.9 kg/mol), and broad polydispersity (Đ=2.18) (Table 6, entry 4). This polymerization result was an important data point in supporting previous shortcomings encountered with the I-PAG/UV system.

Activating precatalyst 3 with UV light and I-PAG lead to photoinduced catalyst deactivation/decomposition from the short wavelength light source. It was hypothesized that utilization of a photosensitizer would eliminate this problem and reinstate catalyst reactivity due to the longer wavelength required to induce acid production. Incorporating BPET and shifting the irradiation wavelength to the visible region, lead to a 182% increase in monomer conversion (28%→51%). In addition, this photochemical activation method improved the monomer conversion by 10% compared to the anilinium borate control activator, all the while producing polymer with similar characteristics ($M_w$=47.9 kg/mol, Đ=2.18) (Table 6, entry 4). This result supports the hypothesis that using a different irradiation wavelength minimizes photochemical deactivation/decomposition. Also, when comparing the efficiency of the photoactivation methods, BPET+I-PAG vs. I-PAG vs. traditional activator, the photosensitized activation process yielded the highest monomer conversion among all three precatalysts.

TABLE 6

Polymerization of 1-hexene using precatalysts 2 & 3 activated by AB or BPET + I-PAG[a]

| Entry | precatalyst | photo-sensitizer | exposure time (min)[b] | % conv. | Mw[c] (kg/mol) | Đ[c] |
|---|---|---|---|---|---|---|
| 1[d] | 2 | none | 0 | 17 ± 0.1 | 4.1 | 2.77 |
| 2[d] | 3 | none | 0 | 41 ± 0.9 | 47.9 | 2.12 |

TABLE 6-continued

Polymerization of 1-hexene using precatalysts 2 & 3 activated by AB or BPET + I-PAG[a]

| Entry | precatalyst | photo-sensitizer | exposure time (min)[b] | % conv. | Mw[c] (kg/mol) | Đ[c] |
|---|---|---|---|---|---|---|
| 3 | 2 | BPET | 5 | 54 ± 4.8 | 5.0 | 2.80 |
| 4 | 3 | BPET | 5 | 51 ± 3.9 | 47.9 | 2.18 |

[a]Polymerization conditions: Polymerization time = 3 h, precatalyst = 10.0 µmol, activator I-PAG = 10.0 µmol, 3 mL of 1-hexene, and 1 mL of DCM at 20° C.
[b]Irradiated using a handheld 4 W compact UV lamp operating at 254 nm.
[c]Determined using triple detection GPC at 150° C. in 1,2,4-trichlorobenzene.
[d]Activator N,N-dimethylanilinium tetra(pentafluorophenyl)borate = 10.0 µmol.

Example 5

Visible Light Activated Polymerization of Ethylene

After demonstrating the effective activation of several olefin polymerization precatalysts bearing distinct characteristics, the monomer library was then expanded by testing a more industrially-relevant olefin feedstock, ethylene. Ethylene polymerizations were conducted using precatalysts 1-3 using optimal conditions established with 1-hexene, as well as proper control experiments previously described (Table 7, entries 1-3). Photosensitized light-activated ethylene polymerizations were conducted by irradiating reactions containing precatalysts 1-3, BPET, and I-PAG for 5 minutes (Table 7, entries 4-6). As expected, polyethylene was produced in comparable yields (46-512 mg) to those produced using the traditional chemical activator AB. The polyethylene produced displayed comparable properties such as, molecular weight ($M_w$=44.0-544.7 kg/mol) and polymer dispersity (Đ=1.83-3.53) when compared to the polymers produced using AB.

Further analyzing the polymerization results, precatalyst 1 produced 426% and 153% more polyethylene than traditional anilinium borate and I-PAG activation methods. Precatalyst 2 produced less polyethylene than its zirconium counterpart, but the PET process improved the production of polyethylene compared to AB and I-PAG activators. In the distinct case of precatalyst 3, the photoinduced activation with I-PAG produced 37% less polymer than AB activated polymerizations, which was attributed to photochemical catalyst deactivation/decomposition. Incorporating the photosensitizer restores the polymer produced by precatalyst 3 back to yields obtained with the traditional activator. Without wishing to be bound by any particular theory as to why polyethylene yields are low, previous reports disclose that ONNO-type zirconium catalysts have shortened lifetimes and are subject to high chain-transfer rates for ethylene polymerizations, which could help explain these polymerization results (Cipullo et al., Macromolecules 2009, 42 (12), 3869-3872.) Overall, the improved catalytic performance instigated by the addition of a photosensitizer for precatalysts 1-3 in solution-phase olefin and α-olefin polymerizations is helpful when testing the gas-phase polymerization capabilities with this photoinduced activation method.

TABLE 7

Polymerization of ethylene using precatalysts 1-3 activated by I-PAG, BPET, and visible light exposure.[a]

| Entry | precatalyst | activator | exposure time (min)[b] | yield (mg) | Mw[c] (kg/mol) | Đ[c] |
|---|---|---|---|---|---|---|
| 1 | 1 | AB | 0 | 120 ± 12.1 | 228.3 | 4.83 |
| 2 | 2 | AB | 0 | 87 ± 14.3 | 89.1 | 2.77 |

TABLE 7-continued

Polymerization of ethylene using precatalysts 1-3 activated by I-PAG, BPET, and visible light exposure.[a]

| Entry | precatalyst | activator | exposure time (min)[b] | yield (mg) | Mw[c] (kg/mol) | Đ[c] |
|---|---|---|---|---|---|---|
| 3 | 3 | AB | 0 | 46 ± 8.5 | 44.3 | 3.03 |
| 4 | 1 | BPET | 5 | 512 ± 30.0 | 544.7 | 3.53 |
| 5 | 2 | BPET | 5 | 194 ± 8.7 | 96.5 | 1.83 |
| 6 | 3 | BPET | 5 | 46 ± 9.3 | 44.0 | 2.72 |

[a]Polymerization conditions: precatalyst = 10.0 µmol, I-PAG = 10.0 µmol, ethylene = 15 psi, 1 mL of DCM, 19 mL of toluene, 20° C., and polymerization time = 30 min.
[b]Irradiated using a handheld 4 W compact UV lamp operating at 254 nm.
[c]Determined using triple detection GPC at 150° C. in 1,2,4-trichlorobenzene.

Example 6

Gas-Phase, 3D Printing of Polyolefins Using Visible Light-Activated Olefin Polymerizations It was hypothesized that the ability to 3D print polyolefins in the gas-phase, in a similar fashion to SLA and DLP printing, could be accomplished via light-activated olefin polymerization. Having demonstrated that UV light can indeed be used as an external stimulus to provide temporal control over the activation olefin polymerization precatalysts, efforts were then turned to studying the ability to harness spatial control for gas-phase olefin polymerizations using this photosensitized activation method.

To determine if polyolefin films could be grown by a gas-phase, visible light-activated olefin polymerization process, ethylene was used as a monomer of choice. Similar to the procedure described above, a solution of desired precatalyst (1-3), I-PAG, and BPET were prepared in DCM and shielded from ambient light. The precatalyst/I-PAG/BPET solution was then deposited onto a support substrate via either drop-casting or spray coating. The casting solvent quickly evaporated leaving a precatalyst-activator residue on the substrate surface, which was loaded into a borosilicate pressure reactor. An added advantage to shifting the absorbance wavelength into the visible region is eliminating the innate pressure restrictions that come with using quartz materials. These borosilicate vessels safely permit pressures up to 100 PSI without influencing transmittance of the light source, here 3 W green LED. Unlocking this capability facilitates use of these gas-phase polymerizations to produce durable 3D polyolefin materials.

Figure 9:
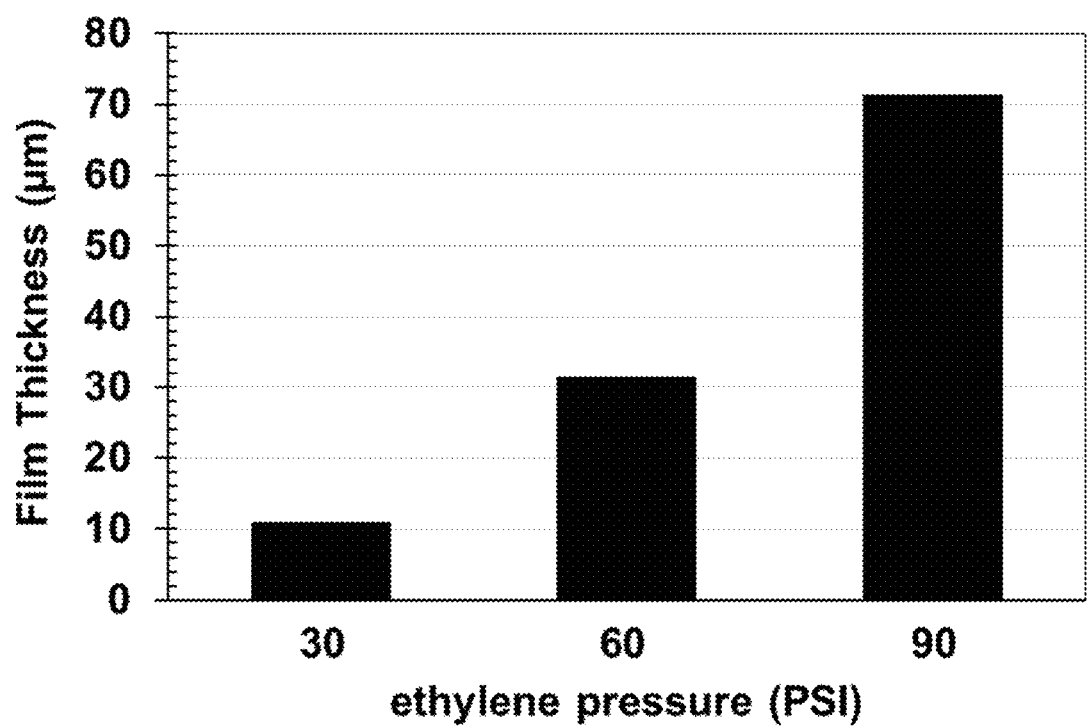
FIG. 9 is bar graph showing gas-phase ethylene polymerizations using precatalyst 1 (30 μmol), I-PAG (30 μmol), BPET (15 μmol), and visible light (5 min.) to investigate the influence of ethylene pressure on film thickness.

In order to understand how monomer pressure influences film formation, an experiment was conducted monitoring film thickness as a function of ethylene pressure (FIG. 9). At constant precatalyst, PAG, and photosensitizer loading, film thickness increases with increasing pressure. These films were prepared using the drop-cast method, which allows for maximum reagent loading but results in nonuniform film formation. This led to a deviation of 17-69 µm between the inside of the polymer film as compared to the outside. Regardless of these film variances, at 90 PSI we can produce films over 100 microns, which will be easier to handle and isolate compared to the 15-30 µm films produced using I-PAG and UV light. Future gas-phase polymerizations will be conducted at 90 PSI for optimal film quality.

Following this study, each precatalyst was loaded onto a glass slide, in addition to the required activating reagents, to produce a polyethylene film which was confirmed via GPC (Table 8). Following the properties of the previous polyethylene films formed via gas-phase polymerization, precatalyst 1 and 2 generated high molecular weight polymer ($M_w$=1.6-2.5×10$^7$ g/mol) with broad polydispersity (Đ=3.88-5.28) (Table 8, entries 1 & 2). As previously mentioned above, these values are not accurate as they exceed the detection limits of the instrument. For the gas-phase ethylene polymerization using precatalyst 3, a high molecular weight thin film similar to the other catalysts was synthesized. Similar to the solution-phase result using this precatalyst, the green LED does not diminish active catalyst lifetime to the extent that UV light does.

TABLE 8

Polymer film properties following gas-phase polymerizations with precatalysts 1-3, BPET, and I-PAG/UV light[a]

| Entry | Precatalyst | Mw[b] (g/mol) | Đ[b] |
|---|---|---|---|
| 1[c] | 1 | 2.5 × 10$^7$ | 3.88 |
| 2 | 2 | 1.6 × 10$^7$ | 5.28 |
| 3 | 3 | — | — |

[a]Polymerization conditions: precatalyst = 50.0 μmol, I-PAG = 50.0 μmol, BPET = 25.0 μmol, ethylene = 90 psi, 20° C., irradiated using a 3 W green LED lightbulb operating at 565 nm for 5 min., and polymerization time = 30 min.
[b]Determined using triple detection GPC at 150° C. in 1,2,4-trichlorobenzene.
[c]Precatalyst = 30.0 μmol, I-PAG = 30.0 μmol, and BPET = 15 μmol.

Figure 10:
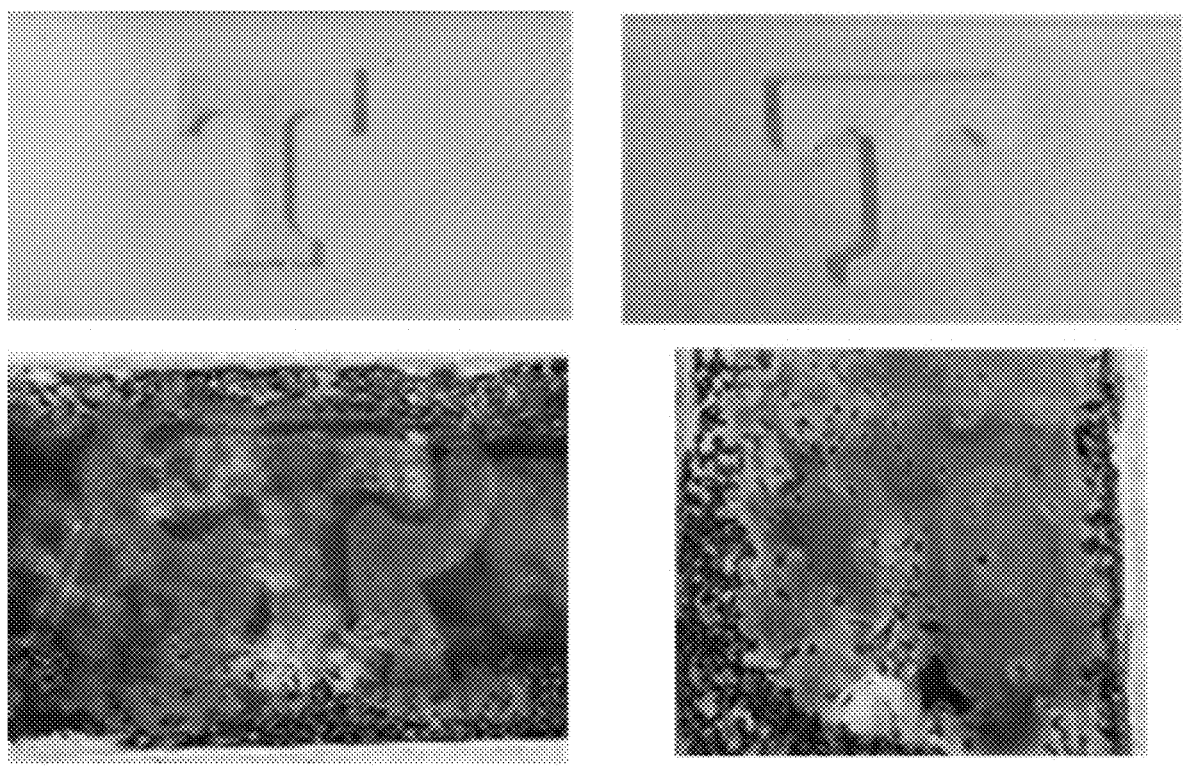
FIG. 10 is a set of photographs of the photomasks used (top images) and the resultant spatially controlled, patterned polyolefin films (bottom images). Note: the black color results when precatalyst 1 is activated using BPET, I-PAG and visible light exposure, while the purple color represents inactivated precatalyst and activator reagents.

Following up after the confirmation of polyethylene formation, experiments were then conducted, testing the spatial control this photosensitized system has on gas-phase olefin polymerizations. Using the same positive and negative-tone masks as before, precatalyst 1, BPET, and I-PAG were dissolved in an organic solvent and drop-casted on a glass slide (FIG. 10). Following proper placement of the mask, the slide was placed in a Fisher Porter pressure tested apparatus and green LED light was used to initiate polymerization at exposed areas. Due to the addition of BPET, the resultant precatalyst-activator residue is a dark purple, but after exposure the catalytically active deposit turns black. This color change is consistent with observations reported by Kohl and coworkers using this photosensitizer with an iodonium salt and is suspected to be from the extension of conjugation between BPET biproducts (Crivello, J. V.; Jang, M., *Journal of Photochemistry and Photobiology A: Chemistry* 2003, 159 (2), 173-188; Phillips et al., *J Appl Polym Sci* 2019, 136 (9), 47141). Following the polymerization, the films were submerged in methanol to decompose the remaining catalyst, followed by a chloroform soak to remove photosensitizer biproducts and present a colorless, patterned polyethylene film.

Discussion of Examples 1-6

The above-presented Examples demonstrate that light-activated olefin polymerization can be accomplished via the combination of alkyl substituted olefin polymerization precatalysts, a photoacid generator (I-PAG), and exposure to light. This methodology provides temporal control over the precatalyst activation process and was used for the solution state polymerization of the olefinic monomers, 1-hexene and ethylene. Detailed $^1$H NMR analysis was used to confirm that UV exposure triggers the incorporated photoacid generator to release protons, which activate the olefin polymerization precatalysts 1-3 by protonolysis of their bound alkyl substituents, yielding the required cationic, active metal site. In addition, it has been confirmed that the addition of a photosensitizer (BPET), in conjunction with I-PAG, can be used to instigate Brønsted acid production via green LED light exposure. The polymerization results with this visible light activation method generally lead to improved monomer conversion or polymer yield regardless of precatalyst or monomer source.

These UV and visible light-activated olefin polymerization methods were then used to produce conformal, as well as spatially patterned polyolefin films from a gas-phase printing process. This finding confirms the ability to spatially regulate polyolefin growth and brings this methodology to a 3D printing process. These results facilitate the ability to 3D print using the world's most widely used and produced polymers, polyolefins.

Materials and Methods Employed in Examples 1-6

General Methods and Materials

All reactions were performed under an inert nitrogen atmosphere using an MBraun UniLab glovebox or using standard Schlenk techniques, unless otherwise noted. All solvents were dried using an Innovative Technologies Pure-Solv Solvent Purification System and degassed via three freeze-pump-thaw cycles. Precatalyst 1 and 2 were purchased from Strem Chemicals Inc. and used as received. Photoreductant I-PAG was purchased from TCI and used as received. Precatalyst 3 and BPET was prepared according to literature procedures (Cipullo et al., *Macromolecules* 2009, 42 (12), 3869-3872; Phillips et al., *J Appl Polym Sci* 2019, 136(9), 47141). All other reagents were purchased from commercial vendors and used without further purification. Gel permeation chromatography (GPC) was performed at 150° C. in 1,2,4-trichlorobenzene at a flow rate of 1.0 mL/min on a Malvern Viscotek HT-GPC equipped with triple detection.

General 1-Hexene Polymerization Conditions

Under an inert atmosphere and shielded from ambient light, a quartz flask was charged with precatalyst 1, 2, or 3 (10 μmol), photoacid generator I-PAG (10 μmol), 1-hexene (3 mL), dichloromethane (1 mL), and a magnetic stir bar. To initiate the polymerization, the reaction flask was irradiated using a handheld 4 W compact UV lamp operating at 254 nm for a pre-determined time. Following irradiation, the reaction was stirred continuously until the total desired reaction time was reached. All polymerizations were quenched, and polymer precipitated, by the addition of MeOH (10 mL). The polymer was collected and dried to constant weight in vacuo (Anderson, W. C.; Long, B. K., *ACS Macro Lett.* 2016, 5 (9), 1029-1033).

General Ethylene Polymerization Conditions

Under an inert atmosphere and shielded from ambient light, a solution of precatalyst 1, 2, or 3 (10 μmol), photoacid generator I-PAG (10 μmol), toluene (19 mL), dichloromethane (1 mL) and a magnetic stir bar were added to a quartz pressure tube reactor and sealed. The vessel was removed from the glove box, pressurized with ethylene gas (15 psi) while stirring, and equilibrated for 10 min prior to photoinitiation. The vessel was irradiated using a handheld 4 W compact UV lamp operating at 254 nm. After 15 min of exposure time, the polymerizations were quenched after an additional 15 minutes via the addition of MeOH (10 mL) and the polymer was precipitated using excess acidic MeOH (5% HCl in MeOH). The polymer was stirred in the acidic methanol for 24 hours then filtered, washed with excess methanol, and dried to constant weight in vacuo.

General Photosensitized 1-hexene Polymerization Conditions

Under an inert atmosphere and shielded from ambient light, a quartz flask was charged with precatalyst 1, 2, or 3 (10 μmol), photoacid generator I-PAG (10 μmol), photosensitizer BPET (5 μmol), 1-hexene (3 mL), dichloromethane (1 mL), and a magnetic stir bar. To initiate the polymerization, the reaction flask was irradiated using a 3 W green LED lightbulb operating at 565 nm for a pre-determined time. Following irradiation, the reaction was stirred continuously until the total desired reaction time was reached. All polymerizations were quenched, and polymer precipitated, by the addition of MeOH (10 mL). The polymer was collected and dried to constant weight in vacuo (Gao et al., *Chem. Commun.* 2015, 51 (32), 7004-7).

General Photosensitized Ethylene Polymerization Conditions

Under an inert atmosphere and shielded from ambient light, a solution of precatalyst 1, 2, or 3 (10 µmol), photoacid generator I-PAG (10 µmol), photosensitizer BPET (5 µmol), toluene (19 mL), dichloromethane (1 mL) and a magnetic stir bar were added to a quartz pressure tube reactor and sealed. The vessel was removed from the glove box, pressurized with ethylene gas (15 psi) while stirring, and equilibrated for 10 min prior to photoinitiation. The vessel was irradiated using a 3 W green LED lightbulb operating at 565 nm. After 5 min of total exposure time, the polymerizations were quenched after 25 minutes of additional polymerization time via the addition of MeOH (10 mL) and the polymer was precipitated using excess acidic MeOH (5% HCl in MeOH). The polymer was stirred in the acidic methanol for 24 hours then filtered, washed with excess methanol, and dried to constant weight in vacuo.

General Method of Polyolefin Film Growth in the Gas-Phase (Both Conformal and Patterned)

Conformal Films

Under an inert atmosphere and shielded from ambient light, a solution of precatalyst 2 (20 µmol), photoacid generator I-PAG (20 µmol), and dichloromethane (1 mL) was prepared. This solution was drop-cast onto a quarter. After solvent evaporation, the coated substrate was loaded into a quartz pressure tube reactor and sealed. The vessel was removed from the glove box, pressurized with either ethylene gas (30 psi), and equilibrated for 10 min prior to photoinitiation. The substrate was then irradiated using a handheld 4 W compact UV lamp operating at 254 nm for 15 minutes to initiate polymerization. After an additional 15 minutes (total polymerization time=30 minutes), the reaction was exposed to air and the reaction quenched using excess MeOH. The resultant films were collected and dried to constant weight in vacuo.

Patterned Films

Under an inert atmosphere and shielded from ambient light, a solution of precatalyst 1 or 2 (50 µmol), photoacid generator I-PAG (50 µmol), and dichloromethane (5 mL) was prepared. This solution was drop-cast or spray-coated onto a glass substrate. After solvent evaporation, the coated substrate was loaded into a quartz pressure tube reactor and sealed. A photomask was also placed on top of the coated substrate after loading into the reactor. The vessel was removed from the glove box, pressurized with ethylene gas (30 psi), and equilibrated for 10 min prior to photoinitiation. The substrate was then irradiated using a handheld 4 W compact UV lamp operating at 254 nm for 15 minutes to initiate polymerization. After a total polymerization time of 30 minutes, the reaction was exposed to air and the reaction quenched using excess MeOH. The resultant films were collected and dried to constant weight in vacuo.

General Method of Photosensitized Polyolefin Film Growth in the Gas-Phase

Under an inert atmosphere and shielded from ambient light, a solution of precatalyst 1 or 2 (50 µmol), photoacid generator I-PAG (50 µmol), photosensitizer BPET (25 µmol), and dichloromethane (5 mL) was prepared. This solution was drop-cast or spray-coated onto a glass substrate. After solvent evaporation, the coated substrate was loaded into a quartz pressure tube reactor and sealed. A photomask was also placed on top of the coated substrate after loading into the reactor. The vessel was removed from the glove box, pressurized with ethylene gas (90 psi), and equilibrated for 10 min prior to photoinitiation. The substrate was then irradiated using a 3 W green LED lightbulb operating at 565 nm for 5 minutes to initiate polymerization. After a total polymerization time of 30 minutes, the reaction was exposed to air and the reaction quenched using excess MeOH. The resultant films were collected and dried to constant weight in vacuo.

Example 7

Solution-State Polymerizations: Non-sensitized Solution-State Polymerization

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (10 µmol), photoacid generator 4-isopropyl-4'-methyldiphenyliodonium tetrakis(pentafluorophenyl)borate (10 µmol), toluene (19 mL), dichloromethane (1 mL) and a magnetic stir bar were added to a quartz pressure tube reactor and sealed. The vessel was removed from the glove box, pressurized with ethylene gas (15 psi) while stirring, and equilibrated for 10 min prior to photoinitiation. The vessel was irradiated using a handheld 4 W compact UV lamp operating at 254 nm. After 15 min of exposure time, the polymerizations were quenched after an additional 15 minutes via the addition of MeOH (10 mL) and the polymer was precipitated using excess acidic MeOH (5% HCl in MeOH). The polymer was stirred in the acidic methanol for 24 hours then filtered, washed with excess methanol, and dried to constant weight in vacuo.

Example 8

Solution-State Polymerizations: Photosensitized Solution-State Polymerization

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (10 µmol), photoacid generator 4-isopropyl-4'-methyldiphenyliodonium tetrakis(pentafluorophenyl)borate (10 µmol), the photosensitizer 5,12-bis(phenylethynyl)tetracene (5 µmol), toluene (19 mL), dichloromethane (1 mL) and a magnetic stir bar were added to a quartz pressure tube reactor and sealed. The vessel was removed from the glove box, pressurized with ethylene gas (15 psi) while stirring, and equilibrated for 10 min prior to photoinitiation. The vessel was irradiated using a 3 W green LED lightbulb operating at 565 nm. After 5 min of total exposure time, the polymerizations were quenched after 25 minutes of additional polymerization time via the addition of MeOH (10 mL) and the polymer was precipitated using excess acidic MeOH (5% HCl in MeOH). The polymer was stirred in the acidic methanol for 24 hours then filtered, washed with excess methanol, and dried to constant weight in vacuo.

Gas-Phase Polymerizations:

Example of a Non-Sensitized Gas-Phase Polymerization (No Patterning/Conformal Film Formation)

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (20 μmol), photoacid generator 4-isopropyl-4'-methyldiphenyliodonium tetrakis(pentafluorophenyl)borate (20 μmol), and dichloromethane (1 mL) was prepared. This solution was drop-cast onto a quarter. After solvent evaporation, the coated substrate was loaded into a quartz pressure tube reactor and sealed. The vessel was removed from the glove box, pressurized with either ethylene gas (30 psi), and equilibrated for 10 min prior to photoinitiation. The substrate was then irradiated using a handheld 4 W compact UV lamp operating at 254 nm for 15 minutes to initiate polymerization. After an additional 15 minutes (Total polymerization time=30 minutes), the reaction was exposed to air and the reaction quenched using excess MeOH. The resultant films were collected and dried to constant weight in vacuo.

Example of a Photosensitized Gas-Phase Polymerization (No Patterning/Conformal Film Formation)

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (20 μmol), photoacid generator 4-isopropyl-4'-methyldiphenyliodonium tetrakis(pentafluorophenyl)borate (20 μmol), the photosensitizer 5,12-bis(phenylethynyl)tetracene, and dichloromethane (1 mL) was prepared. This solution was drop-cast onto a quarter. After solvent evaporation, the coated substrate was loaded into a quartz pressure tube reactor and sealed. The vessel was removed from the glove box, pressurized with either ethylene gas (30 psi), and equilibrated for 10 min prior to photoinitiation. The substrate was then irradiated using a 3 W green LED lightbulb operating at 565 nm for 5 minutes to initiate polymerization. After an additional 15 minutes (Total polymerization time=20 minutes), the reaction was exposed to air and the reaction quenched using excess MeOH. The resultant films were collected and dried to constant weight in vacuo.

Example of a Non-Sensitized Gas-Phase Polymerization (Patterned Film Formation)

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (50 μmol), photoacid generator 4-isopropyl-4'-methyldiphenyliodonium tetrakis(pentafluorophenyl)borate (50 μmol), and dichloromethane (5 mL) was prepared. This solution was drop-cast or spray-coated onto a glass substrate. After solvent evaporation, the coated substrate was loaded into a quartz pressure tube reactor and sealed. A photomask was also placed on top of the coated substrate after loading into the reactor. The vessel was removed from the glove box, pressurized with ethylene gas (30 psi), and equilibrated for 10 min prior to photoinitiation. The substrate was then irradiated using a handheld 4 W compact UV lamp operating at 254 nm for 15 minutes to initiate polymerization. After a total polymerization time of 30 minutes, the reaction was exposed to air and the reaction quenched using excess MeOH. The resultant films were collected and dried to constant weight in vacuo.

Example of a Photosensitized Gas-Phase Polymerization (Patterned Film Formation)

Under an inert atmosphere and shielded from ambient light, a solution of precatalyst dimethylbis(indenyl) zirconium, dimethylbis(tert-butylcyclopentadienyl) halfnium, or a salan ligated dimethylzirconium complex (50 μmol), photoacid generator 4-isopropyl-4'-methyldiphenyliodonium tetrakis(pentafluorophenyl)borate (50 μmol), the photosensitizer 5,12-bis(phenylethynyl)tetracene, and dichloromethane (5 mL) was prepared. This solution was drop-cast or spray-coated onto a glass substrate. After solvent evaporation, the coated substrate was loaded into a quartz pressure tube reactor and sealed. A photomask was also placed on top of the coated substrate after loading into the reactor. The vessel was removed from the glove box, pressurized with ethylene gas (30 psi), and equilibrated for 10 min prior to photoinitiation. The substrate was then irradiated using a 3 W green LED lightbulb operating at 565 nm for 5 minutes to initiate polymerization. After a total polymerization time of 20 minutes, the reaction was exposed to air and the reaction quenched using excess MeOH. The resultant films were collected and dried to constant weight in vacuo.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of preparing a polyolefin, the method comprising:
    (a) contacting an olefin monomer with an olefin polymerization precatalyst and a photoacid generator (PAG) to provide an olefin polymerization mixture, wherein said olefin monomer is provided as a gas or as a liquid, and wherein said contacting comprises:
        (a1) dissolving the PAG and the precatalyst in a solvent, thereby preparing a solution of the PAG and the precatalyst;
        (a2) depositing the solution on a surface of a solid substrate;
        (a3) evaporating the solvent to provide a residue comprising the PAG and the precatalyst; and
        (a4) contacting the residue with the olefin monomer, thereby providing the olefin polymerization mixture; and
    (b) irradiating the olefin polymerization mixture for a first period of time with ultraviolet or visible light, activating the precatalyst to catalyze polymerization of the olefin monomer, thereby preparing a polyolefin film on the surface of the solid substrate.

2. The method of claim 1, wherein the method further comprises quenching the olefin polymerization mixture after a second period of time by contacting the olefin polymerization mixture with air, alcohol, water, acid, or any organic solvent containing those species.

3. The method of claim 1, wherein the olefin monomer is selected from the group consisting of linear or branched $C_2$-$C_{12}$ alkenes, acrolein, an acrylate, a methacrylate, acrylonitrile, a vinyl ester, an aryl substituted alpha olefin, a styrene, a conjugated or unconjugated diene, a cyclic alkene, and any combination thereof.

4. The method of claim 1, wherein the olefin monomer is a linear or branched $C_2$-$C_{12}$ alpha olefin or a mixture thereof.

5. The method of claim 1, wherein the precatalyst is selected from the group consisting of a metallocene precatalyst, a constrained geometry precatalyst, a monocyclopentadienyl amidinate precatalyst, a bisamidinate precatalyst, a diamine bis(phenolate) precatalyst, a pyridylamidohalfnium precatalyst, a phenoxyimine precatalyst, an α-diimine precatalyst, and a diamide ligated precatalyst.

6. The method of claim 1, wherein the PAG is selected from the group consisting of an ammonium or diazonium salt, a phosphonium salt, an alkyl, aryl, or allylic onium salt, a sulfonium salt, an iodonium salt, a ferrocenium complex or iron arene complex-based onium salt, a latent thermal/photoinduced onium salt, a bismuthonium salt comprising a pyrenyl group, a triazine compound, compounds containing N—O bonds, benzyl carboxylates and benzyl sulfonates, and two photon absorbing compounds.

7. The method of claim 1, wherein the olefin polymerization mixture of (a) comprises about 0.05 mol % to about 200 mol % of the PAG compared to an amount of the precatalyst.

8. The method of claim 1, wherein the irradiating is performed with ultraviolet light.

9. The method of claim 1, wherein step (a) further comprises contacting the PAG with a photosensitizer, and wherein the irradiating of step (b) is performed with visible light or ultraviolet light.

10. The method of claim 9, wherein the photosensitizer is selected from the group consisting of a benzodioxinone compound, a boron-dipyrromethene dye, a carbazole, a conjugated olefin, a cyanine dye, a diketopyrrolopyrole (DPP), a dithienothiophene, an isobenzofuran, a ketone, a metal carbonyl compound, a natural dye, a phenothiazine, a conjugated polynuclear aromatic compound, a quinoxaline, and an acridinedione.

11. The method of claim 9, wherein PAG is contacted with between about 0.01 molar equivalents and about 3 molar equivalents of the photosensitizer.

12. The method of claim 1, wherein prior to the irradiating of step (b), a portion of the surface of the solid substrate is covered with a photomask, thereby blocking irradiation of a portion of the residue, and wherein the irradiating provides a patterned polyolefin film.

13. The method of claim 1, wherein the olefin monomer is provided as a gas.

14. The method of claim 1, wherein the solution of the PAG and the precatalyst further comprises a photosensitizer.

15. The method of claim 1, wherein the olefin monomer is provided as a liquid.

16. The method of claim 1, wherein the method further comprises:
   (c) depositing a composition comprising a PAG and a precatalyst on an exposed surface of the polyolefin film provided in step (b),
   (d) contacting the composition comprising the PAG and the precatalyst with an olefin monomer, wherein said olefin monomer can be a same or different olefin monomer as the olefin monomer of step (a) to form a second olefin polymerization mixture; and
   (f) irradiating the second olefin polymerization mixture for a period of time with ultraviolet or visible light, thereby activating the precatalyst to catalyze polymerization of the olefin monomer, thereby preparing a second polyolefin film, wherein the polyolefin film provided in step (b) and the second polyolefin film together form a multilayered polyolefin structure.

17. The method of claim 1, wherein the polyolefin film is removed from the solid substrate.

18. The method of claim 1, further comprising repeating steps (a) to (b) to create subsequent layers of the polyolefin.

19. A multilayered polyolefin product produced by the method of claim 18.

* * * * *